(12) United States Patent
Nagayama

(10) Patent No.: US 6,854,943 B2
(45) Date of Patent: Feb. 15, 2005

(54) T-NUT

(75) Inventor: Yutaka Nagayama, Kishiwada (JP)

(73) Assignee: Nagayama Electronic Industry Co., Ltd., Naga-gun (JP)

(*) Notice: Subject to any disclaimer, the term of this patent is extended or adjusted under 35 U.S.C. 154(b) by 0 days.

(21) Appl. No.: 10/607,084

(22) Filed: Jun. 27, 2003

(65) Prior Publication Data

US 2004/0022599 A1 Feb. 5, 2004

(30) Foreign Application Priority Data

Jun. 27, 2002 (JP) ........................................ 2002-187706

(51) Int. Cl.[7] .............................................. F16B 37/14
(52) U.S. Cl. ....................................... 411/429; 411/179
(58) Field of Search ................................ 411/429, 427, 411/82, 82.1, 187, 179

(56) References Cited

U.S. PATENT DOCUMENTS

| | | | | |
|---|---|---|---|---|
| 3,270,610 A | * | 9/1966 | Knowlton | 411/427 |
| 3,356,401 A | * | 12/1967 | Bertram | 52/506.05 |
| 3,771,272 A | * | 11/1973 | Mihaly et al. | 52/787.1 |
| 4,341,053 A | * | 7/1982 | Dettfurth et al. | 52/787.1 |
| 4,875,817 A | * | 10/1989 | Suzumura et al. | 411/171 |
| 5,195,854 A | | 3/1993 | Nagayama | 411/427 |
| 5,238,344 A | | 8/1993 | Nagayama | 411/183 |
| 5,348,432 A | | 9/1994 | Nagayama | 411/183 |
| 5,429,466 A | | 7/1995 | Nagayama | 411/179 |
| 5,503,596 A | | 4/1996 | Nagayama | 470/25 |
| 5,609,351 A | * | 3/1997 | Vermillion | 280/611 |
| 5,823,729 A | | 10/1998 | Nagayama | 411/429 |
| 5,904,461 A | * | 5/1999 | McKarge, Jr. | 411/302 |
| 5,908,664 A | | 6/1999 | Nagayama | 427/358 |
| 6,109,849 A | | 8/2000 | Nagayama | 411/181 |
| 6,139,237 A | | 10/2000 | Nagayama | 411/181 |
| 6,183,181 B1 | * | 2/2001 | Leistner et al. | 411/177 |
| 6,439,818 B1 | | 8/2002 | Nagayama | 411/436 |
| 6,511,274 B1 | | 1/2003 | Nagayama | 411/179 |

FOREIGN PATENT DOCUMENTS

| | | |
|---|---|---|
| DE | 91 15 292 | 2/1992 |
| JP | 895346 | 4/1994 |
| JP | 895348 | 4/1994 |
| JP | 908545 | 10/1994 |
| JP | 8-6739 | 1/1996 |
| JP | 2517493 | 4/1996 |
| JP | 2517494 | 4/1996 |
| JP | 2547171 | 8/1996 |
| JP | 2597288 | 1/1997 |
| JP | 2613166 | 2/1997 |
| JP | 2676181 | 7/1997 |
| JP | 1017904 | 8/1998 |
| JP | 2839472 | 10/1998 |
| JP | 2940898 | 6/1999 |
| JP | 3310879 | 5/2002 |
| JP | 3310928 | 5/2002 |
| JP | 3310934 | 5/2002 |
| JP | 3310939 | 5/2002 |
| JP | 3313097 | 5/2002 |
| JP | 3398298 | 2/2003 |

OTHER PUBLICATIONS

Communication dated Nov. 20, 2003 and European Search Report.

* cited by examiner

Primary Examiner—Flemming Saether
(74) Attorney, Agent, or Firm—Westerman, Hattori, Daniels & Adrian, LLP

(57) ABSTRACT

The present invention provides a T-nut having an improved structure capable of preventing a liquid, such as oil or paint, from entering into the inside of a shank of the T-nut. The T-nut has a tubular shank having a first end and a second end located on the other side of the first end, and a flange extending outward from the first end of the shank. The shank and flange are made of metal material and formed integrally. At least a part of the shank is formed as an internally threaded portion. The T-nut comprises a bottom-sealing member located adjacent to the first end of the shank to seal the bottom of the tubular shank.

17 Claims, 50 Drawing Sheets

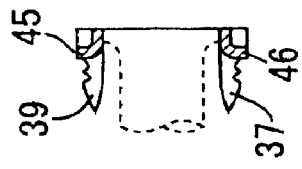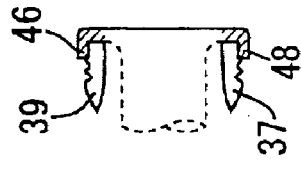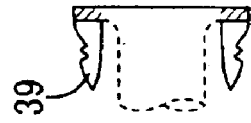
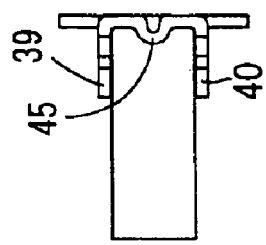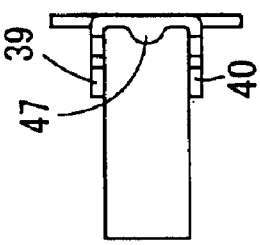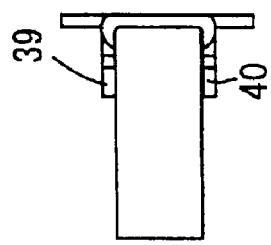
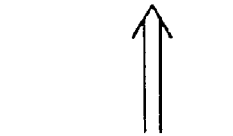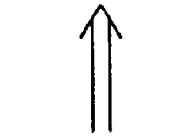
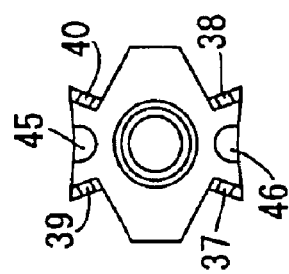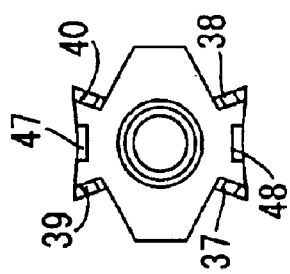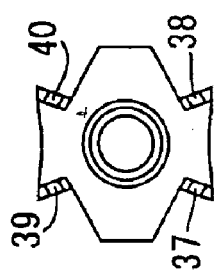
Fig. 6 (a)     Fig. 6 (b)     Fig. 6 (c)

Fig. 10 (a) step barrel 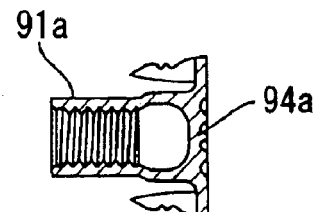
Fig. 10 (b) straight barrel 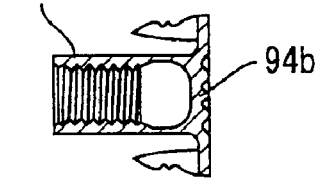
Fig. 10 (c) taper barrel 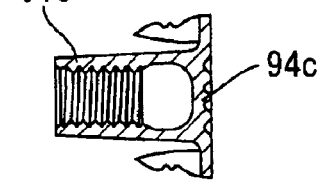

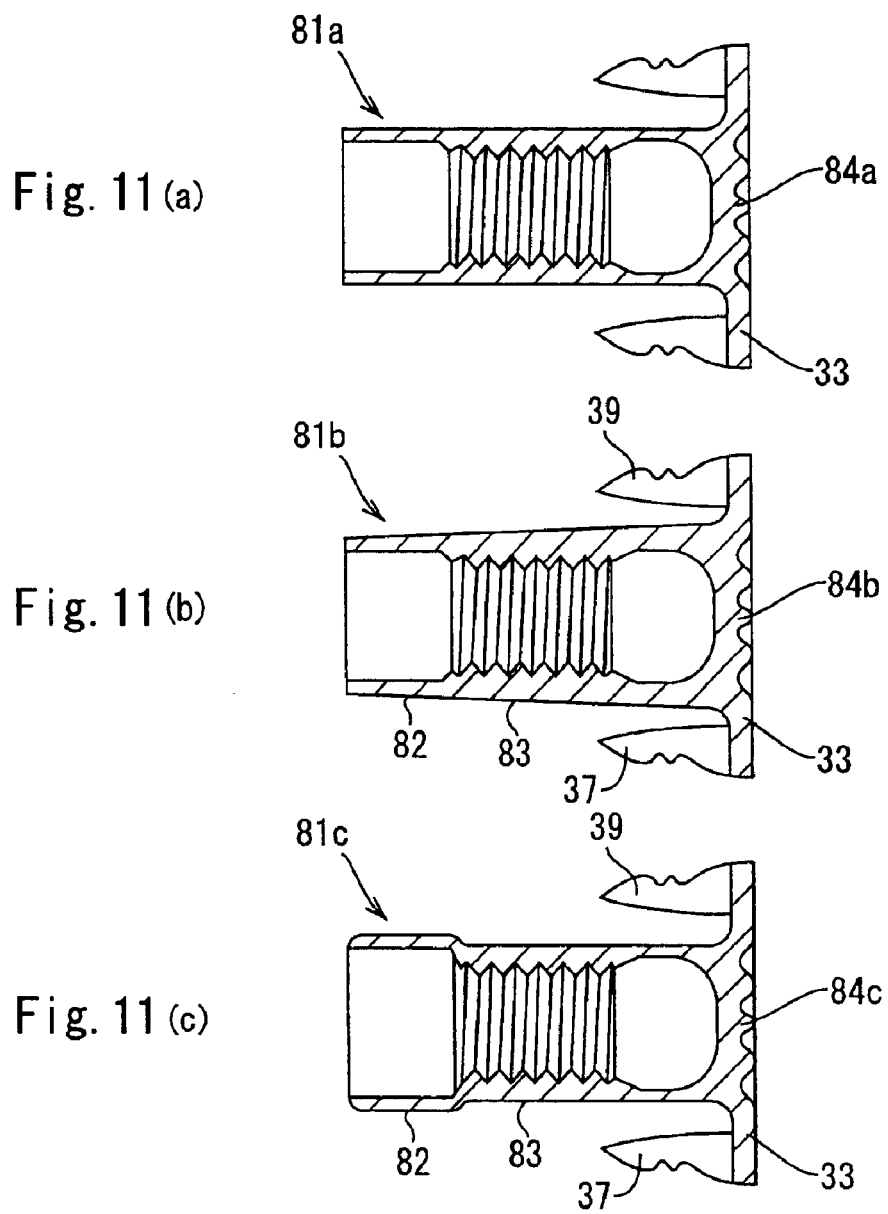

Fig. 12 ( a )
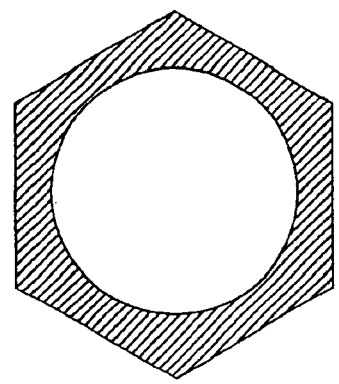
Fig. 12 ( b )
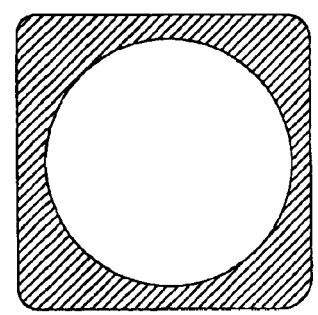
Fig. 12 ( c )
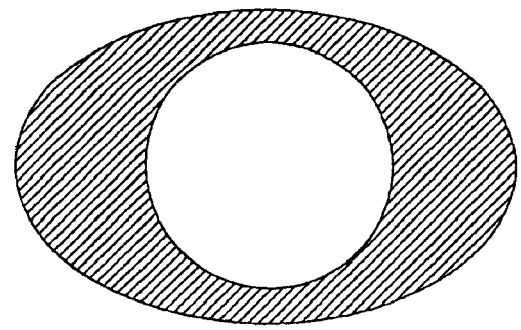

Fig. 13(e)
bottom
Fig. 13 (a) step barrel 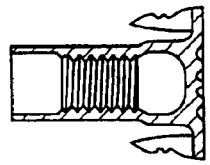 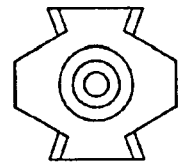
Fig. 13 (b) straight barrel 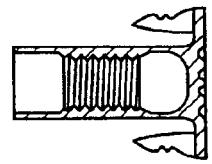
Fig. 13 (c) taper barrel 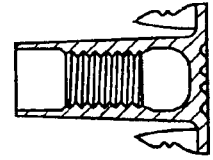
Fig. 13 (d) top-broad barrel 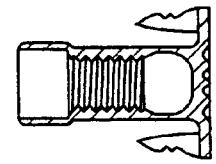
Fig. 13(i)
Fig. 13 (f) step barrel 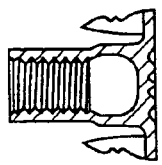 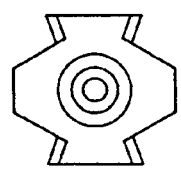
Fig. 13 (g) straight barrel 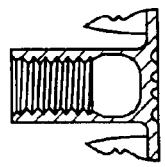
Fig. 13 (h) taper barrel 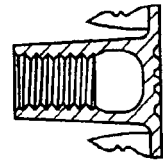

Fig. 14(e) bottom
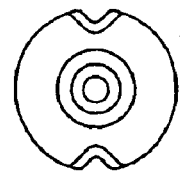
Fig. 14 (a) step barrel 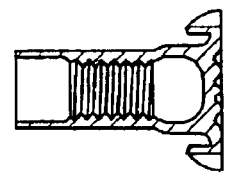
Fig. 14 (b) straight barrel 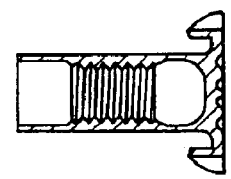
Fig. 14 (c) taper barrel 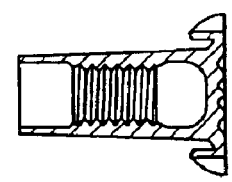
Fig. 14 (d) top-broad barrel 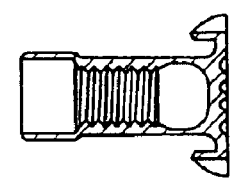
---
Fig. 14 (f) step barrel 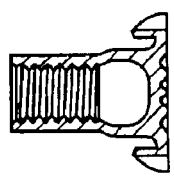
Fig. 14 (g) straight barrel 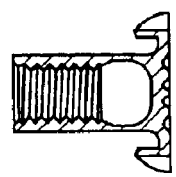
Fig. 14 (h) taper barrel 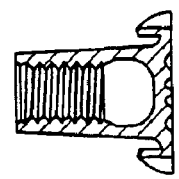

Fig. 15(e)
bottom
Fig. 15 (a) step barrel 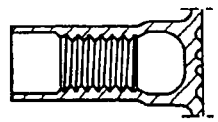 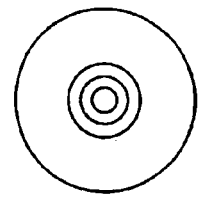
Fig. 15 (b) straight barrel 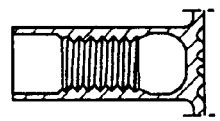 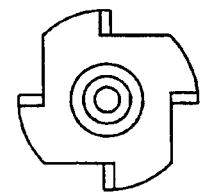
Fig. 15 (c) taper barrel 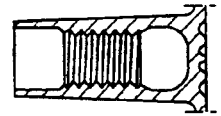 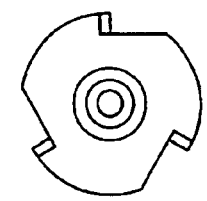
Fig. 15 (d) top-broad barrel 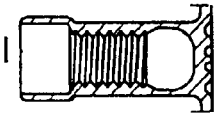 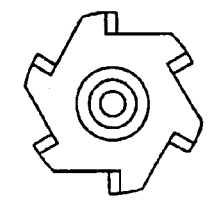
Fig. 15 (f) step barrel 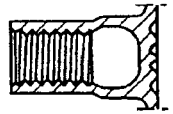
Fig. 15 (g) straight barrel 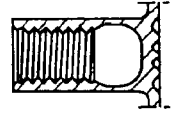
Fig. 15 (h) taper barrel 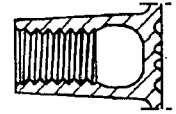

Prior Art 44A  33A

Fig. 28
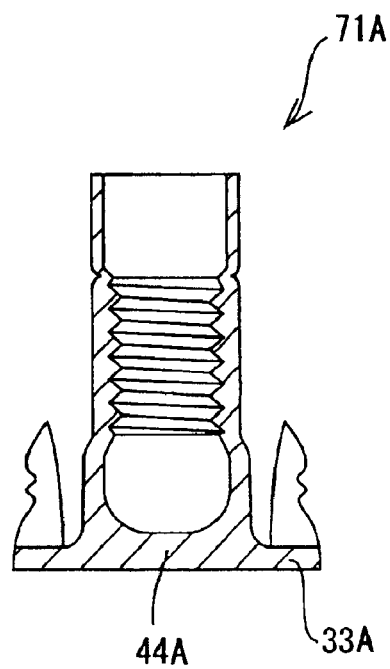
Fig. 29 (a) step barrel 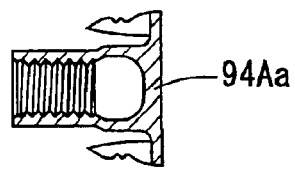
Fig. 29 (b) straight barrel 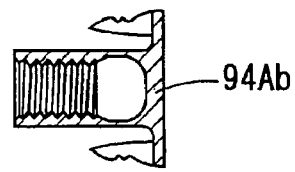
Fig. 29 (c) taper barrel 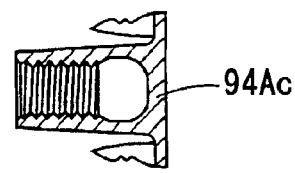

Fig. 31(a) step barrel 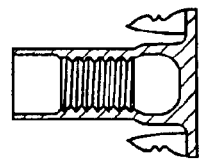  Fig. 31(e) bottom 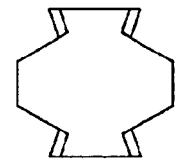
Fig. 31(b) straight barrel 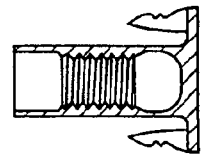
Fig. 31(c) taper barrel 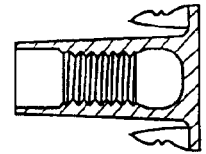
Fig. 31(d) top-broad barrel 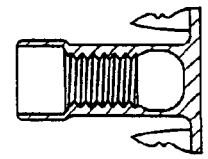
Fig. 31(f) step barrel 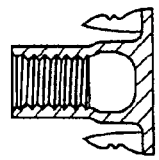  Fig. 31(i) 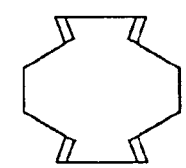
Fig. 31(g) straight barrel 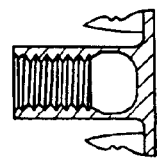
Fig. 31(h) taper barrel 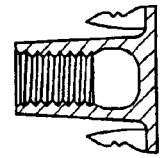

Fig. 32(a) step barrel 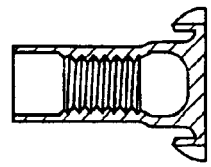
Fig. 32(e) bottom 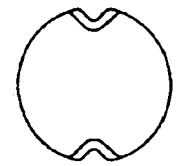
Fig. 32(b) straight barrel 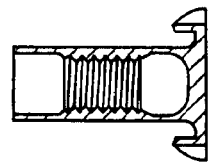
Fig. 32(c) taper barrel 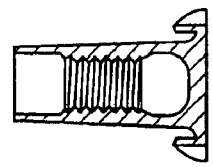
Fig. 32(d) top-broad barrel 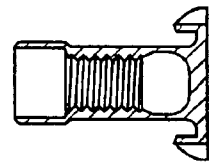
Fig. 32(f) step barrel 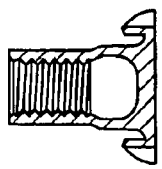
Fig. 32(g) straight barrel 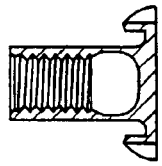
Fig. 32(h) taper barrel 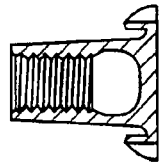

Fig. 33(a) step barrel 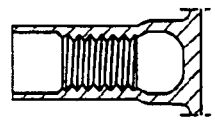
Fig. 33(e) bottom 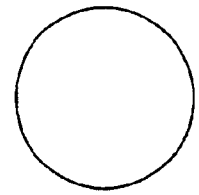
Fig. 33(b) straight barrel 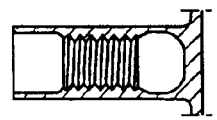
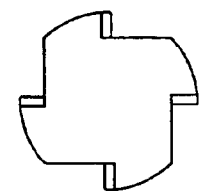
Fig. 33(c) taper barrel 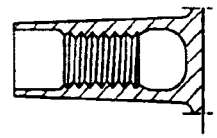
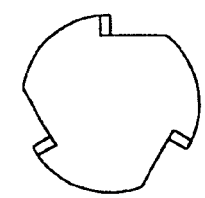
Fig. 33(d) top-broad barrel 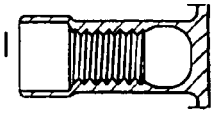
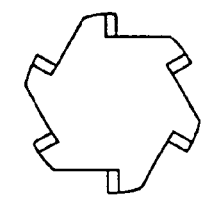
Fig. 33(f) step barrel 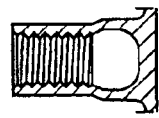
Fig. 33(g) straight barrel 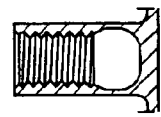
Fig. 33(h) taper barrel 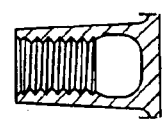

Fig. 43
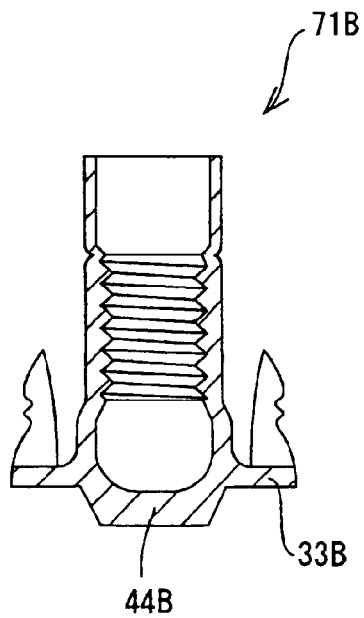
Fig. 44 (a) step barrel 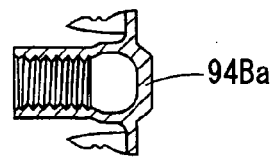
Fig. 44 (b) straight barrel 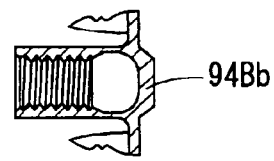
Fig. 44 (c) taper barrel 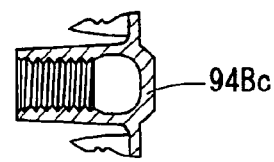

Fig. 46(a) step barrel 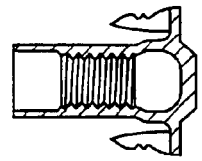
Fig. 46(e) bottom 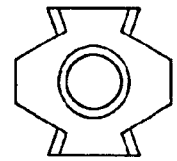
Fig. 46(b) straight barrel 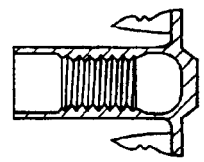
Fig. 46(c) taper barrel 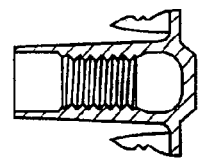
Fig. 46(d) top-broad barrel 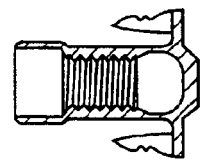
Fig. 46(f) step barrel 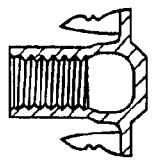

Fig. 46(g) straight barrel 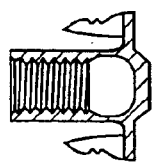
Fig. 46(h) taper barrel 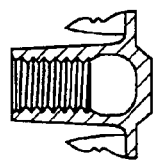

Fig. 47(e) bottom
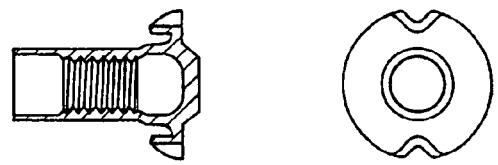
Fig. 47(a) step barrel 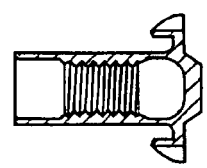
Fig. 47(b) straight barrel
Fig. 47(c) taper barrel 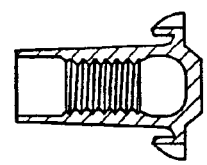
Fig. 47(d) top-broad barrel 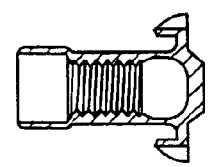
Fig. 47(f) step barrel 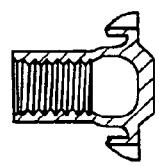
Fig. 47(g) straight barrel 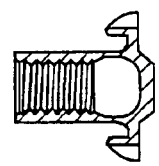
Fig. 47(h) taper barrel 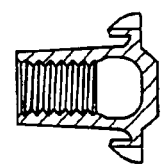

Fig. 48(a) step barrel 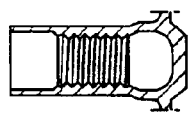
Fig. 48(e) bottom 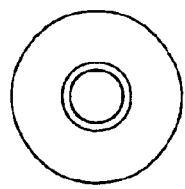
Fig. 48(b) straight barrel 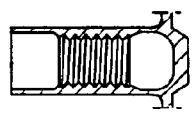
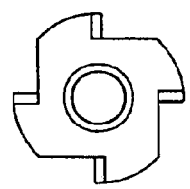
Fig. 48(c) taper barrel 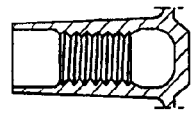
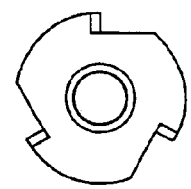
Fig. 48(d) top-broad barrel 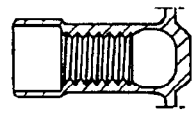
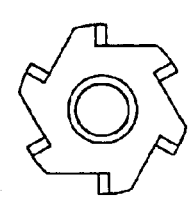
Fig. 48(f) step barrel 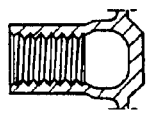
Fig. 48(g) straight barrel 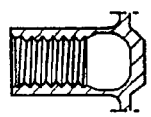
Fig. 48(h) taper barrel 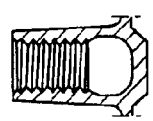

T-NUT

FIELD OF THE INVENTION

The present invention relates to a T-nut which includes a hollow shank having an internal thread formed in the inner peripheral surface thereof, and a flange extending outward from one of the ends of the shank.

BACKGROUND OF THE INVENTION

There has been known one type of T-nut, as disclosed, for example, in Japanese Patent Laid-Open Publication No. H04-341606 or H06-323315. These T-nuts include a shank having a thin-walled portion to be caulked or crimped. Specifically, a T-nut 11 disclosed in the above Japanese Patent Laid-Open Publication No. H04-341606 has a shape as shown in FIGS. 23(a) and 23(b), and comprises a shank 12 and a flange 13 extending from outward from a first end of the shank 12. The shank 12 and the flange 13 can be integrally formed, for example, by processing an iron-based metal sheet.

The shank 12 has a hollow tubular shape with an even outer diameter. The shank 12 includes a portion 14 to be crimped (hereinafter referred to as "crimpable portion") at a second end of the shank on the other side of the first end, and an internally threaded portion 15, or the remaining portion of the shank 12 other than the crimpable portion 14, which has an internal thread 15a formed in the inner peripheral surface thereof. The crimpable portion 14 has a thinner wall than that of the internally threaded portion 15. Thus, in a machining process of forming the internal thread 15a, a thread cutting operation can be performed from either side of the first and second ends of the shank 12.

The flange 13 includes a pair of pawls 16 formed by pressing a part of the outer peripheral edge of the flange 13 in the inward direction from the outside. The pair of pawls 16 protrude toward the second end of the shank 12 while being opposed to one another at 180-degree. As a result of forming the pawls 16, a pair of corresponding notches 17 each having an approximately semicircular cross-section are left in the outer peripheral edge of the flange 13.

The above T-nut 11 is used in its fixed state, for example, as shown in FIG. 24(a). Referring to FIG. 24(a), the shank 12 is first inserted into a through-hole 18 which is formed in advance in a workpiece 19 made resin material or wood, and then the crimpable portion 14 is crimped by a crimping machine to form a crimped portion 14a on the side of one of the surfaces of the workpiece 19. Through this crimpable operation, the pawls 16 are also driven to bite into the other surface of the workpiece 19. In this way, an operation of fixing the T-nut 11 to the workpiece 19 is completed.

A T-nut 31 disclosed in the above Japanese Patent Laid-Open Publication No. H06-323315 has a shape as shown in FIGS. 25(a) and 25(b), and comprises a shank 32 and a flange 33 extending from outward from a first end of the shank 32. The shank 32 and the flange 33 can be integrally formed, for example, by processing an iron-based metal sheet. The shank 32 includes an internally threaded portion 35 having an internal thread 36 formed in the inner peripheral surface of the shank, and a crimpable portion 34. The structure of the T-nut 33 is different from that of the aforementioned T-nut 11 in that the outer peripheral portion of the flange 33 is formed with two pairs of pawls 37/38 and 39/40 disposed opposed to one another in the radial direction of the flange 33 and each extending from a first end toward a second end of the shank 32, and the flange 33 has a substantially octagonal shape in its entirety.

This T-nut 31 is generally referred to as "hopper feed T-nut", because the T-nut can be smoothly moved along a feed track of a nut setter for fixedly setting the T-nut 31 to a workpiece to allow the nut setter to automatically feed the T-nuts. The detail of one type of the hopper feed T-nut is disclosed in British Patent No. 1,157,734.

The T-nut 31 is used in the same fixed state as that of the T-nut 11, for example, as shown in FIG. 24(b). Specifically, the shank 32 of the T-nut 31 is inserted into a through-hole 18 of a workpiece 19, and then the crimpable portion 34 is crimped by a crimping machine to form a crimped portion 34a on the side of one of the surfaces of the workpiece 19. Simultaneously, the pawls 37–40 are driven to bite into the other surface of the workpiece 19.

In the fixed state of the T-nut 31, the pawls 37–40 prevent the T-nut 31 from being rotated relative to the workpiece 19, and the flange 33 and the crimped portion 34a cramps the workpiece 19 therebetween to prevent the T-nut 31 from escaping from the through-hole 18. Thus, the T-nut 31 is firmly fixed to the workpiece 19, and this fixed state will be semi-permanently maintained.

Another type of T-nut having no crimpable portion is fixed through the same operation except for the crimpable process.

After the T-nut 11, 31 is fixed to the workpiece 19 as shown in FIGS. 24(a) and 24(b), one surface 19A of the workpiece 19 is applied with a liquid such as oil or paint, or is immersed into the liquid, in some cases.

In such a case, the liquid, such as oil or paint, can enter in an opening portion 11A, 31A of the T-nut 11, 31 at the first end thereof. The liquid which has entered in the opening portion 11A, 31A of the T-nut 11, 31 should be removed in view of its adverse affect on subsequent operations and quality maintenance. However, if the liquid which has entered from the opening portion into the inside of the shank is removed for each of a number of T-nuts, it will be an extremely inefficient and time-consuming operation.

SUMMARY OF THE INVENTION

In view of the above conventional problem, it is therefore an object of the present invention to provide a T-nut having an improved structure capable of preventing a liquid, such as oil or paint, from entering into the inside of a shank of the T-nut.

In order to achieve this object, according to a first aspect of the present invention, there is provided a T-nut including a tubular shank having a first end and a second end located on the other side of the first end, and a flange extending outward from the first end of the shank, wherein the shank and flange are made of metal material and formed integrally, and at least a part of the shank is formed as an internally threaded portion. The T-nut comprises a bottom-sealing member located adjacent to the first end of the shank to seal the bottom of the tubular shank.

According to a second aspect of the present invention, there is provided a T-nut including a tubular shank having a first end and a second end located on the other side of the first end, and an approximately octagonal flange extending outward from the -first end of the shank, wherein the shank and flange are made of metal material and formed integrally, the outer peripheral portion of the flange being formed with a plurality of pawls extending in parallel with each other from the first end toward the second end of the shank, and at least a part of the tubular shank being formed as an internally threaded portion. The T-nut comprises a bottom-sealing member located adjacent to the first end of the shank to seal the bottom of the tubular shank.

In the T-nut as set forth in the first or second aspect of the present invention, the shank may include a stepped portion formed at a given axial position of the shank, a tubular upper portion extending from the second end to the stepped portion, and an enlarged tubular lower portion extending from the stepped portion to the flange and having an outer diameter greater than that of the upper portion.

The outer peripheral surface of the shank may have a shape gradually expanding from the second end toward the first end.

The shank may include a crimpable portion extending from the second end by a given length. In this case, the crimpable portion of the shank may have an inner diameter greater than that of the internally threaded portion, and an outer diameter greater than that of the internally threaded portion. Further, the outer peripheral surface of the shank may include an annular concave groove formed therein in the vicinity of the boundary between the crimpable portion and the internally threaded portion.

In the T-nut as set forth in the first or second aspect of the present invention, the flange may be formed with a protrusion extending toward the second end.

In the T-nut as set forth in the first aspect of the present invention, the outer peripheral portion of the flange may also be formed with a plurality of pawls extending from the first end toward the second end, as with the T-nut as set forth in the second aspect of the present invention. The pawls may be formed in a jagged shape. Alternatively, the pawls may be formed in a hook shape.

In the T-nut as set forth in the first or second aspect of the present invention, the flange may have an approximately circular shape. Alternatively, the flange may have an approximately octagonal shape.

The flange may have a longitudinal length greater than the lateral length thereof. Alternatively, the flange may have a longitudinal length equal to the lateral length thereof. Further, the flange may have a longitudinal length less than the lateral length thereof.

The T-nut as set forth in the first or second aspect of the present invention may have a space formed between the internally threaded portion and the bottom-sealing member.

In the T-nut as set forth in the first or second aspect of the present invention, the bottom-sealing member may be made of the same material as that of the shank and formed integrally with the shank.

According the above T-nut of the present invention, the first end on the side of the flange is sealed by the bottom-sealing member. Thus, even if the T-nut is applied with a liquid, such as oil or paint, from the side of the first end thereof, or is immersed into the liquid from the side of the first end thereof, the bottom-sealing member can prevent the liquid from entering into the inside of the shank.

Since the second end of the shank is not sealed, a fastening member such as a bolt can be driven into the internal thread formed in the inner peripheral surface of the shank.

BRIEF DESCRIPTION OF THE DRAWINGS

FIG. 6 is an explanatory view of various types of T-nuts of the present invention.

FIG. 10 is sectional side views of various types of T-nuts of the present invention.

FIG. 11 is sectional side views of various types of T-nuts of the present invention.

FIG. 12 is sectional top plan views of the substantial portions of various types of T-nuts of the present invention.

FIG. 13 is sectional side views and bottom views of various types of T-nuts of the present invention.

FIG. 14 is sectional side views and bottom views of various types of T-nuts of the present invention.

FIG. 15 is sectional side views and bottom views of various types of T-nuts of the present invention.

FIG. 28 is a sectional side view showing another type of T-nut.

FIG. 29 is sectional side views of various types of T-nuts, wherein the exposed outer surface of a bottom-sealing member is formed as a flat surface.

FIG. 31 is sectional side views and bottom views of various types of T-nuts, wherein the exposed outer surface of a bottom-sealing member is formed as a flat surface.

FIG. 32 is sectional side views and bottom views of various types of T-nuts, wherein the exposed outer surface of a bottom-sealing member is formed as a flat surface.

FIG. 33 is sectional side views and bottom views of various types of T-nuts, wherein the exposed outer surface of a bottom-sealing member is formed as a flat surface.

FIG. 43 is a sectional side view of still another type of T-nut.

FIG. 44 is sectional side views of various types of T-nuts, wherein the exposed outer surface of a bottom-sealing member is formed as a convex surface.

FIG. 47 is sectional side views and bottom views of various types of T-nuts, wherein the exposed outer surface of a bottom-sealing member is formed as a convex surface.

FIG. 48 is sectional side views and bottom views of various types of T-nuts, wherein the exposed outer surface of a bottom-sealing member is formed as a convex surface.

DESCRIPTION OF THE PREFERRED EMBODIMENT

With reference to drawings, various embodiment of the present invention will now be described.

Figure 25:
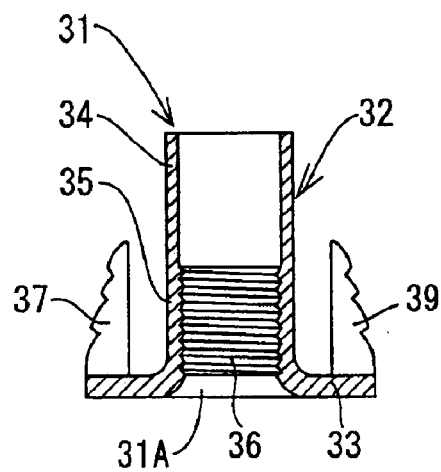
FIG. 25 is an explanatory view of another conventional T-nut.
Figure 25:
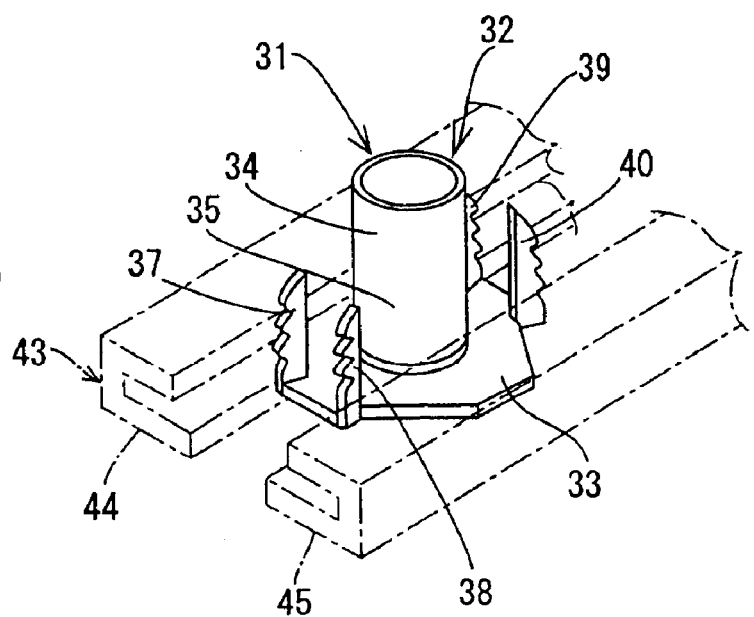

As shown in FIGS. 1(a) and 1(b) and FIG. 4(a), a T-nut 41 according one embodiment of the present invention comprises a shank 2 and a flange 33. The shapes of the shank 2 and the flange 33 are similar to those of the shank 32 and the flange 33 of the conventional T-nut 31 disclosed in the Japanese Patent Laid-Open Publication No. H06-323315 which has been descried in connection with FIG. 25. Thus, the common components or elements with those of the conventional T-nut 31 are defined by the same reference numerals or codes, and their detailed description will be omitted. In these figures, the reference numeral 4 indicates a hollow-cylindrical upper portion of the shank.

The T-nut 41 according to this embodiment is different from the conventional T-nut 31 in that the first end of the shank 2 (corresponding to the opening portion 31A in FIG. 25) is sealed by a bottom-sealing member 44. Thus, an internal thread 36 is formed such that it does not reach the first end of the shank 2. In other words, a small space S is formed between an internally threaded portion 35 and the bottom-sealing member 44.

While the bottom-sealing member 44 is preferably made of the same material as that of the shank and formed integrally with the shank, it may be a separate component to be fixedly attached to the shank.

Figure 1:
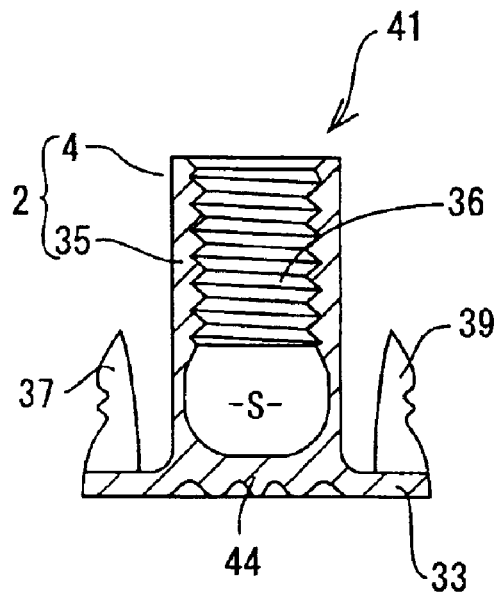
FIG. 1 is a sectional side view and a bottom view of a T-nut according to one embodiment of the present invention.
Figure 1:
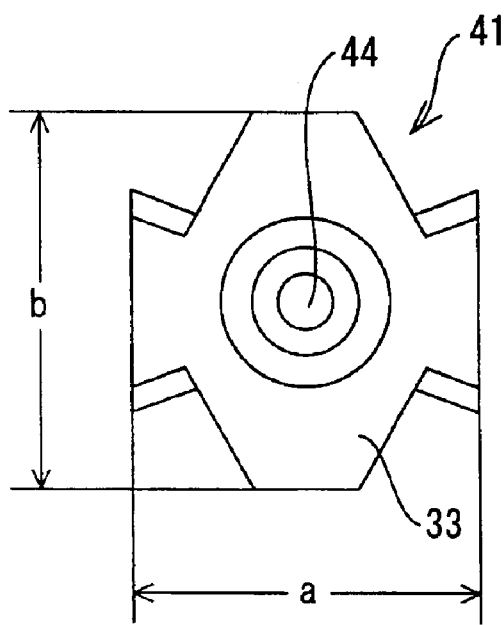
Figure 2:
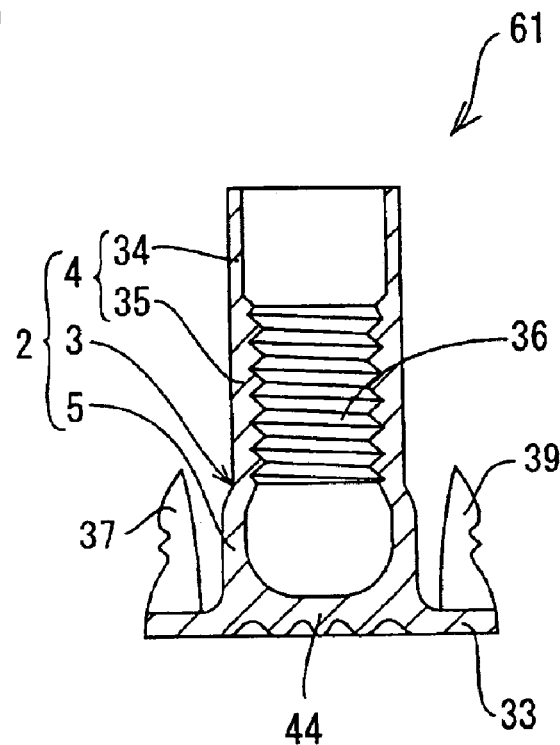
FIG. 2 is a sectional side view and a bottom view of a T-nut according to another embodiment of the present invention.
Figure 2:
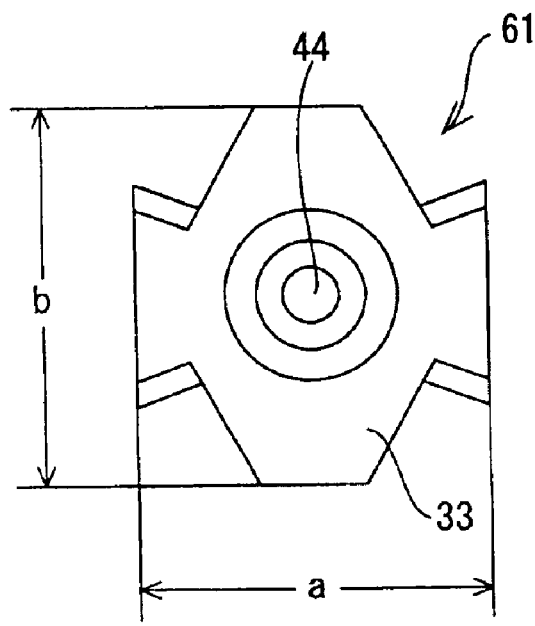
Figure 3:
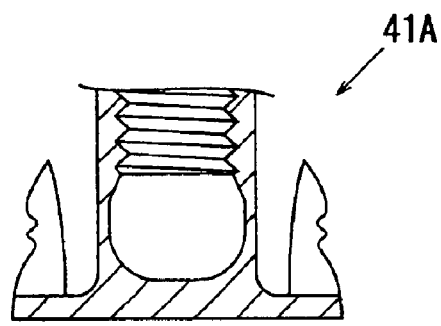
FIG. 3 is sectional side views of modifications of a bottom-sealing member.
Figure 3:
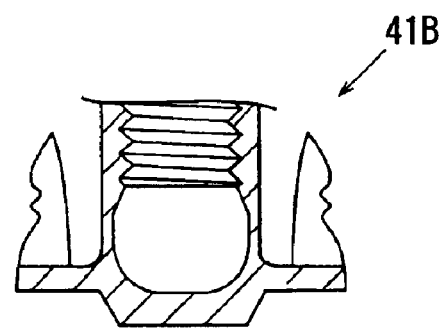
Figure 3:
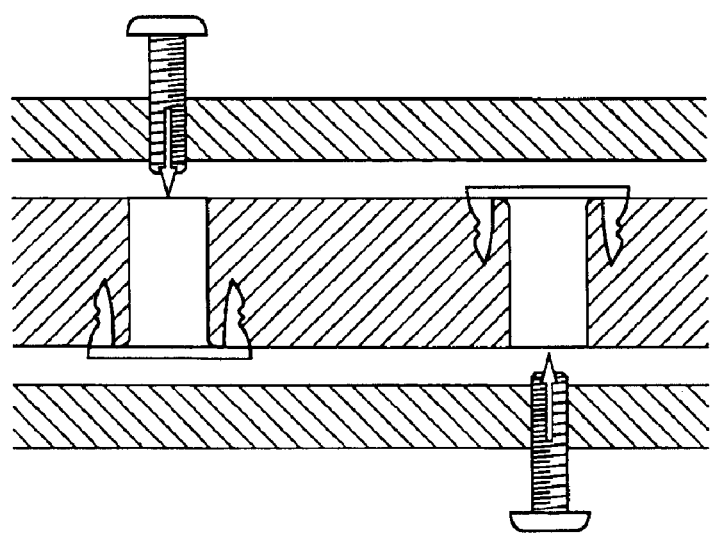

As shown in FIGS. 1 and 2, the exposed outer surface of the bottom-sealing member 44 may be formed with approximately concentric grooves. Alternatively, it may be formed as a flat surface as shown in FIG. 3(a) or a convex surface as shown in FIG. 3(b).

The grooves formed in the outer surface as shown in FIGS. 1 and 2 can cause corrosion of the outer surface due to contaminations or chemicals deposited therein according to use conditions, and provide a poor appearance.

From this point of view, the flat surface as shown in FIG. 3(a) can effectively prevent deposit of contaminations or chemicals and provides an excellent appearance.

Figure 26A:
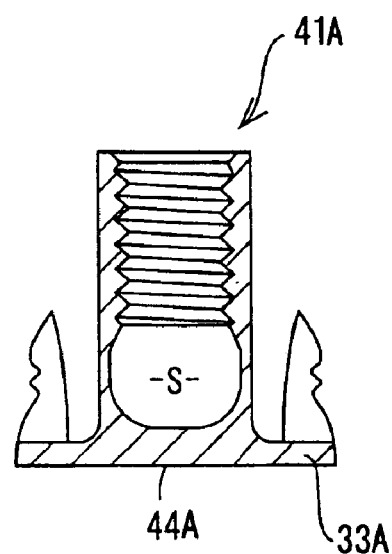
FIG. 26 is a sectional side view and a bottom view of a T-nut of the present invention, wherein the outer surface of a bottom-sealing member is formed as a flat surface.
Figure 26B:
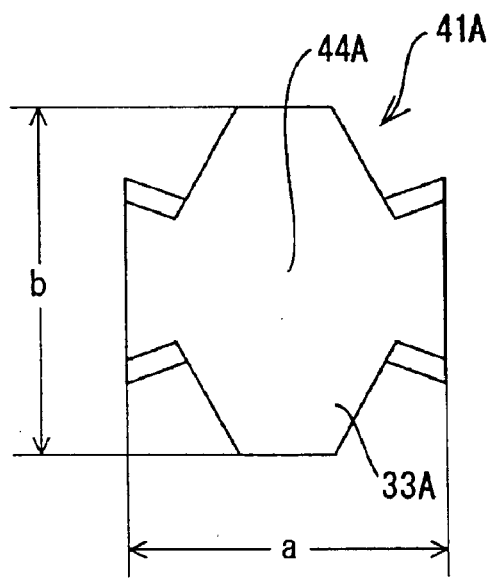
Figure 27:
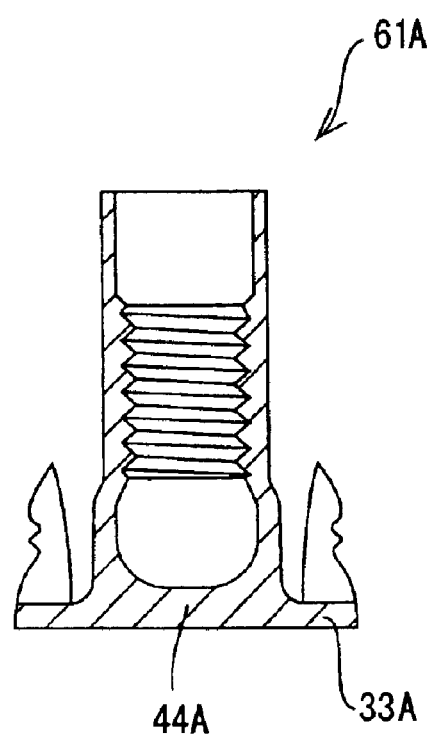
FIG. 27 is a sectional side view and a bottom view of another type of T-nut.
Figure 27:
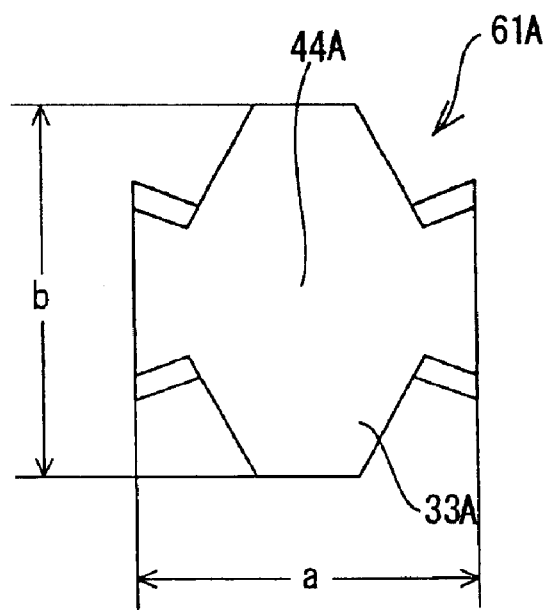
Figure 30:
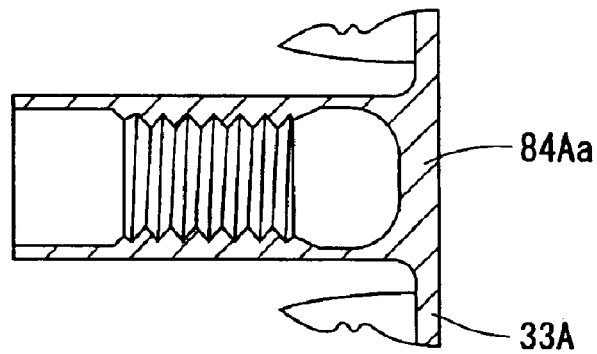
FIG. 30 is sectional side views of various types of T-nuts, wherein the exposed outer surface of a bottom-sealing member is formed as a flat surface.
Figure 30:
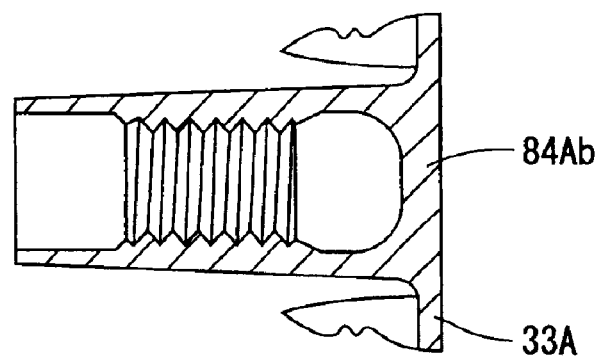
Figure 30:
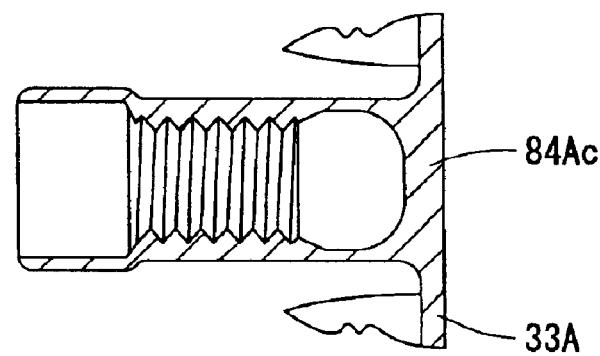
Figure 34:
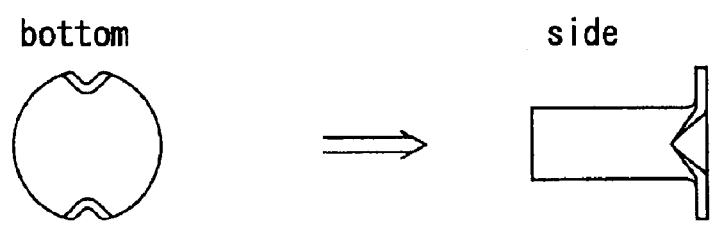
FIG. 34 is a bottom view and a side view of one type of T-nut, wherein the exposed outer surface of a bottom-sealing member is formed as a flat surface.
Figure 35:
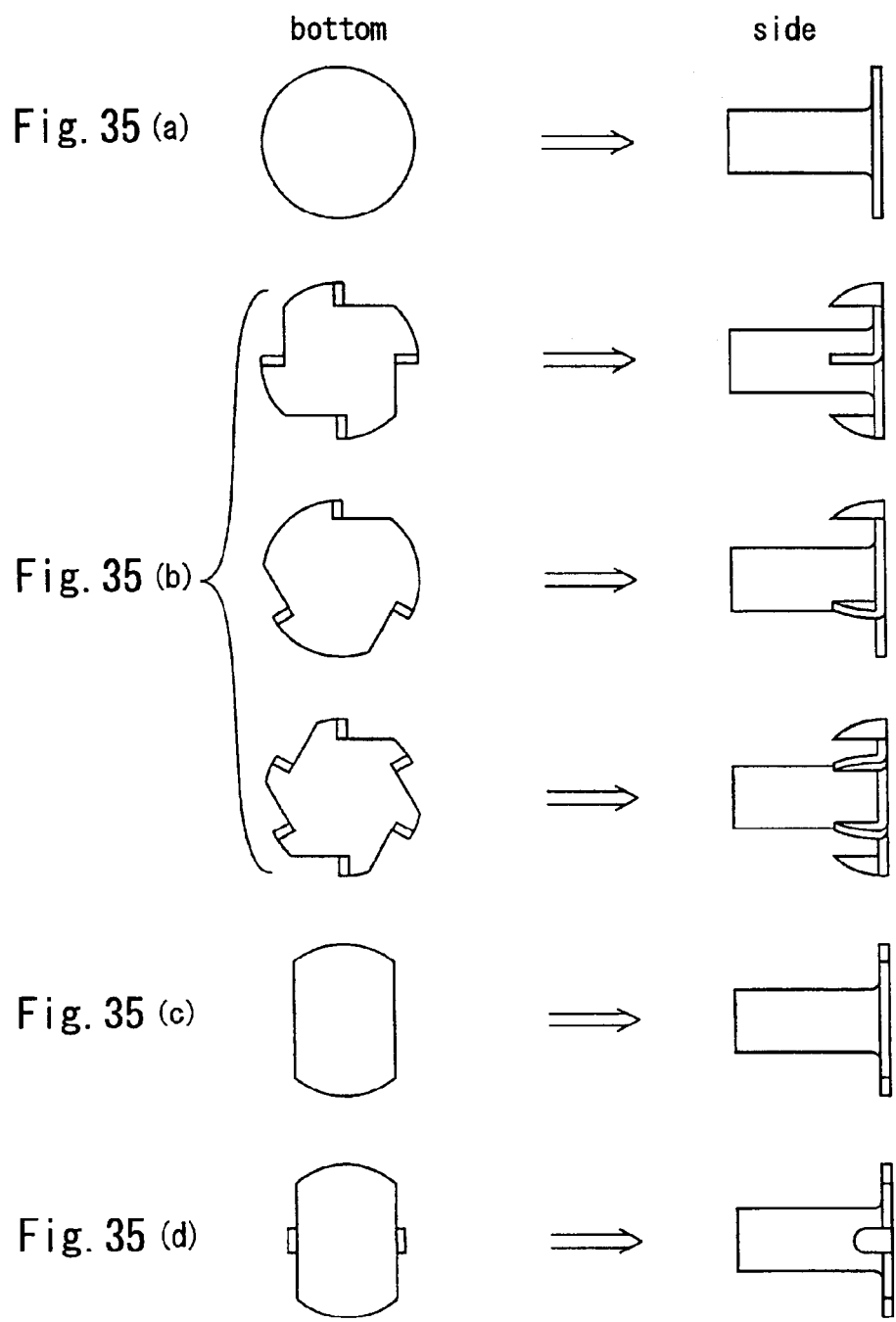
FIG. 35 is bottom views and side views of various types of T-nuts, wherein the exposed outer surface of a bottom-sealing member is formed as a flat surface.
Figure 36:
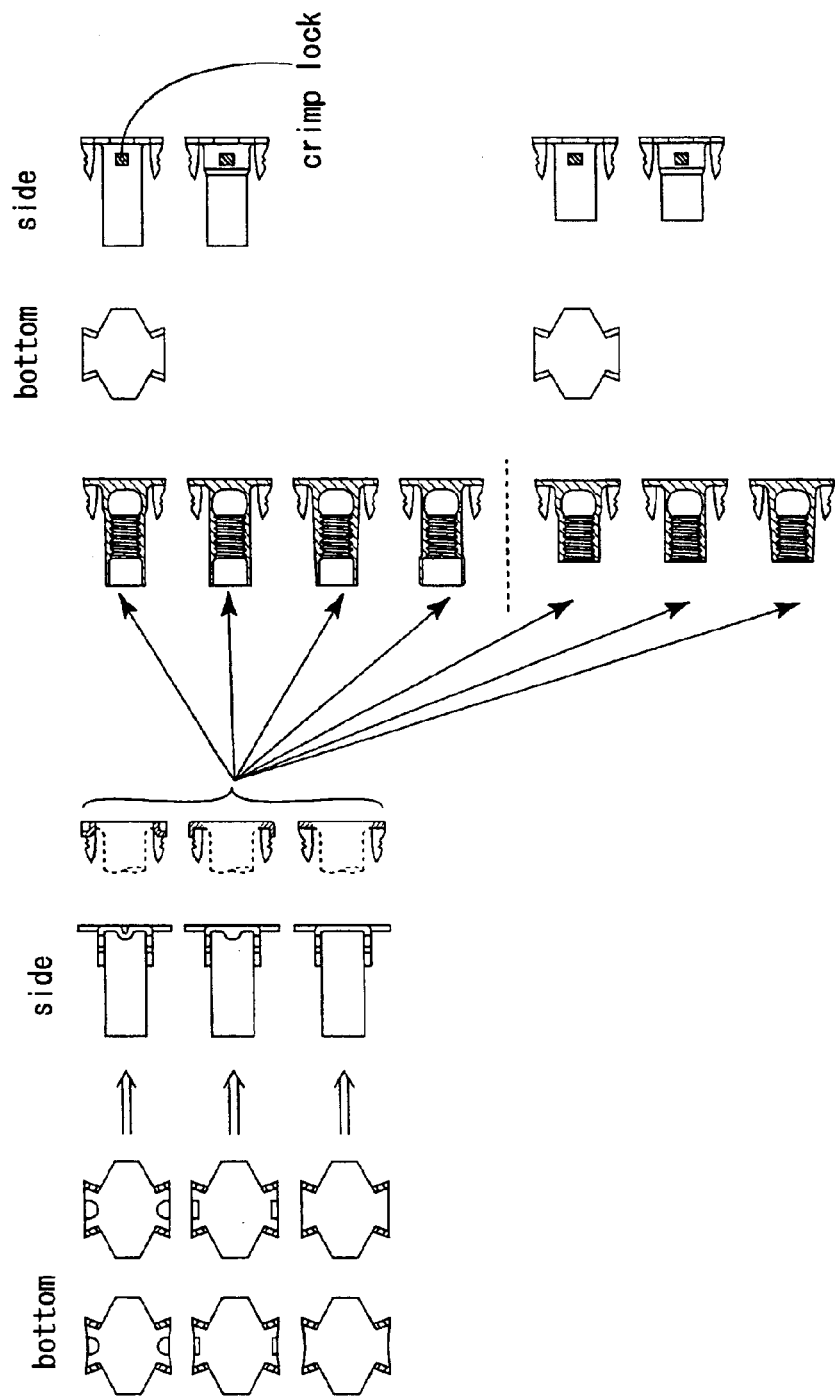
FIG. 36 is explanatory views of various types of T-nuts, wherein the exposed outer surface of a bottom-sealing member is formed as a flat surface.
Figure 37:
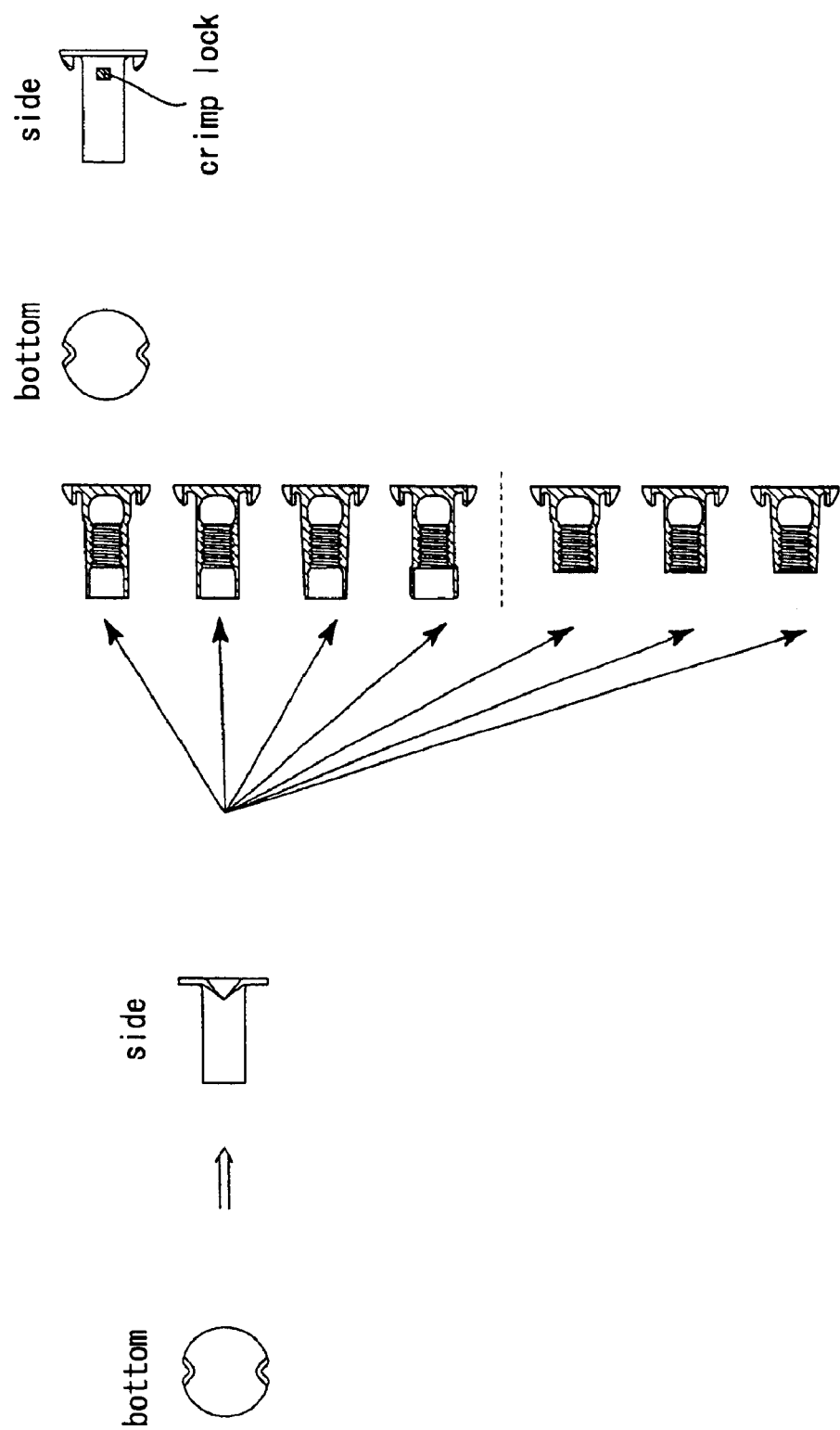
FIG. 37 is explanatory views of various types of T-nuts, wherein the exposed outer surface of a bottom-sealing member is formed as a flat surface.
Figure 38:
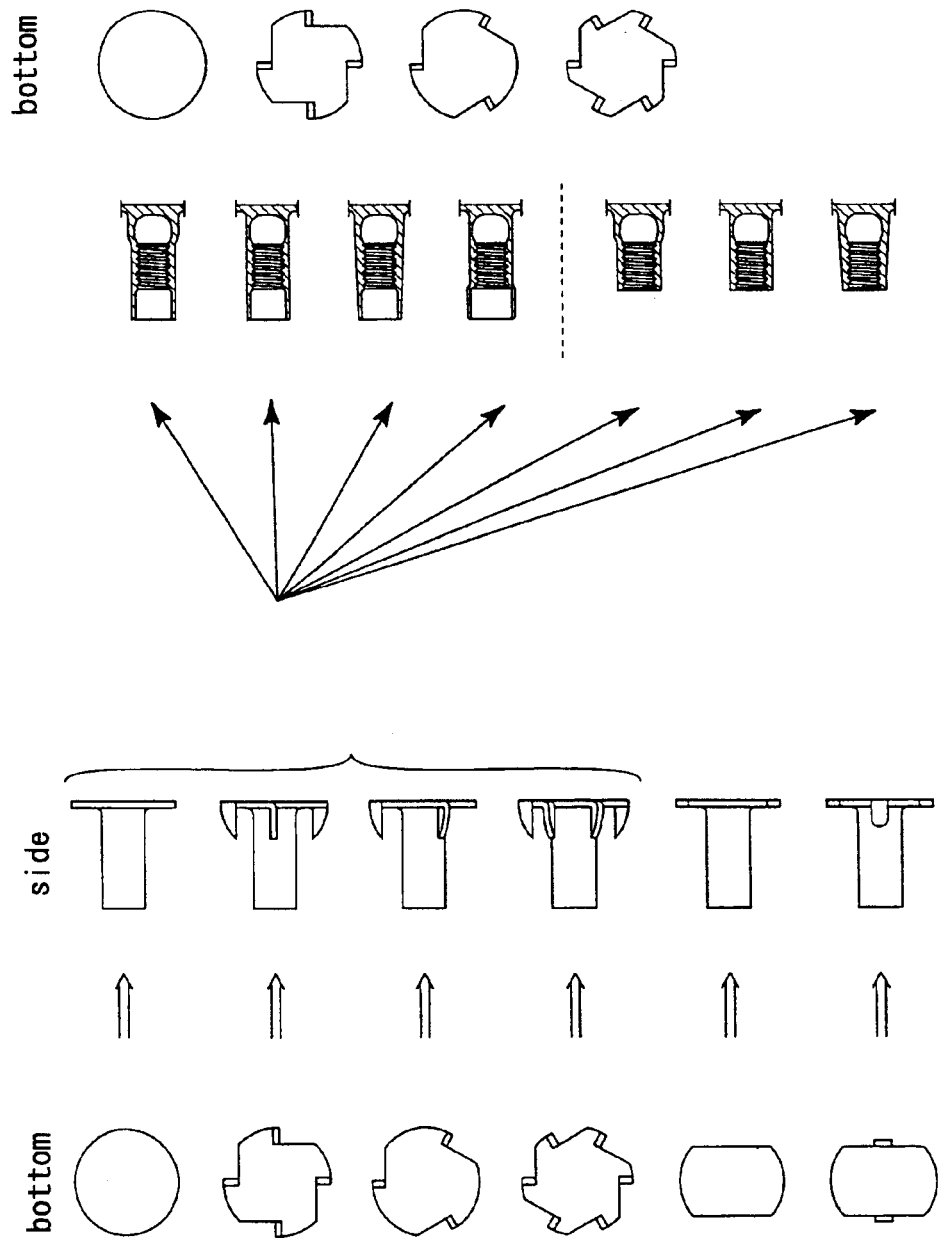
FIG. 38 is explanatory views of various types of T-nuts, wherein the exposed outer surface of a bottom-sealing member is formed as a flat surface.
Figure 39:
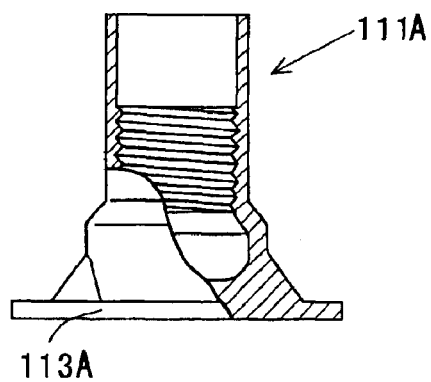
FIG. 39 is a partially sectional side view and a top plan view of another type of T-nut, wherein the exposed outer surface of the bottom-sealing member is formed as a flat surface.
Figure 39:
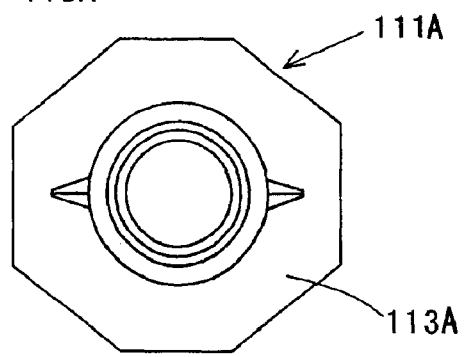
Figure 40:
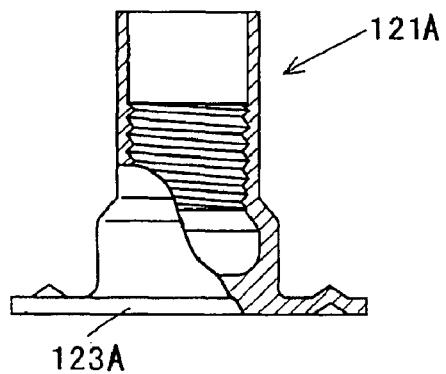
FIG. 40 is a partially sectional side view and a top plan view of still another type of T-nut, wherein the exposed outer surface of the bottom-sealing member is formed as a flat surface.
Figure 40:
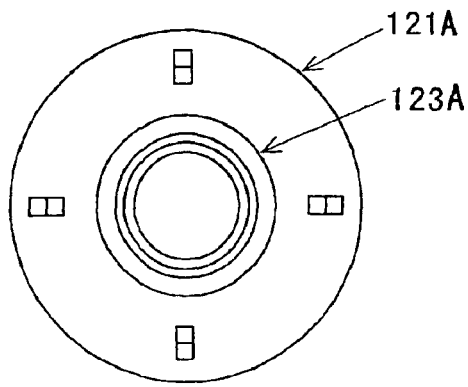

FIGS. 26 and 27 show T-nuts of a type in which the exposed outer surface of a bottom-seating member is formed as a flat surface.

A T-nut 41A as shown in FIGS. 26(a) and 26 (b) has a bottom-sealing member 44A formed in a flat shape. A T-nut 61A as shown in FIGS. 27(a) and 27(b) also has a bottom-sealing member 44A formed in a flat shape. Except for the structure of the bottom-sealing member, the T-nuts 41A and 61A in FIGS. 26 and 27 have the same structures as those of the T-nuts 41 as shown in FIG. 1 and a T-nut 61 as shown in FIG. 2, respectively, and the description of their structures has been omitted herein.

When the exposed outer surface of the bottom-sealing member is formed as a convex surface as shown in FIG. 3(b), the small space S can be displaced from the position in FIG. 1 toward a flange 33B so as to form an internal thread 361 closer to the flange 33B, as shown in FIG. 41(a). The internal thread 361 formed close to the flange 33B allows of the shank to have a more reduced length c than that in FIG. 1 or 2 even when the effective threads of the internal thread is set in the same number as that in FIG. 1 or 2. The amount of material for the shank can be reduced as the length of the shank is reduced, to provide an effect of reducing cost.

Figure 41:
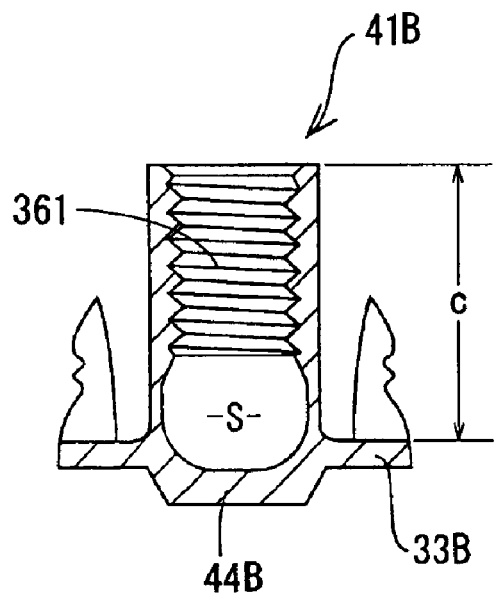
FIG. 41 is a sectional side view and a bottom view of a T-nut of the present invention, wherein the exposed outer surface of a bottom-sealing member is formed as a convex surface.
Figure 41:
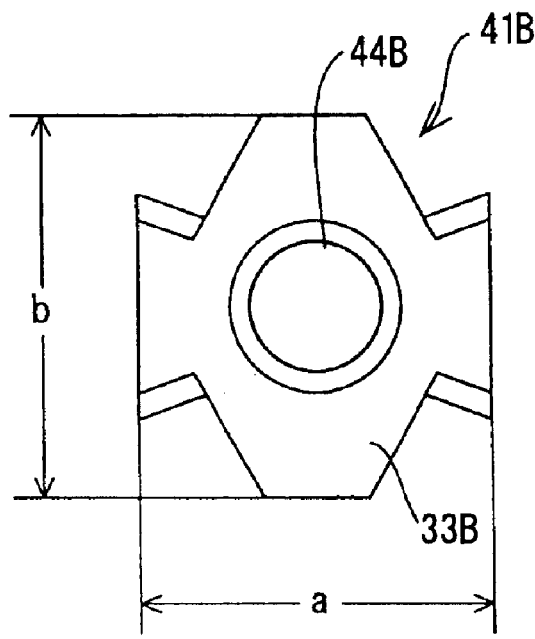

FIGS. 41 and 42 show T-nuts of a type in which the exposed outer surface of the bottom-sealing member 44 is formed as a convex surface.

Figure 42A:
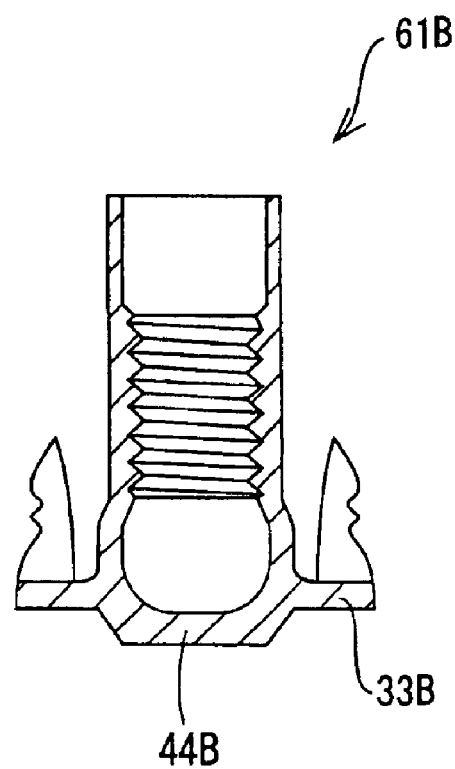
FIG. 42 is a sectional side view and a bottom view of another type of T-nut.
Figure 42B:
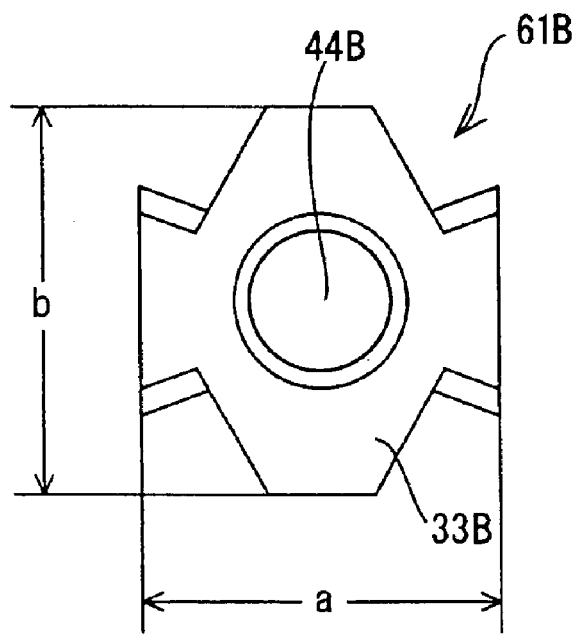
Figure 45:
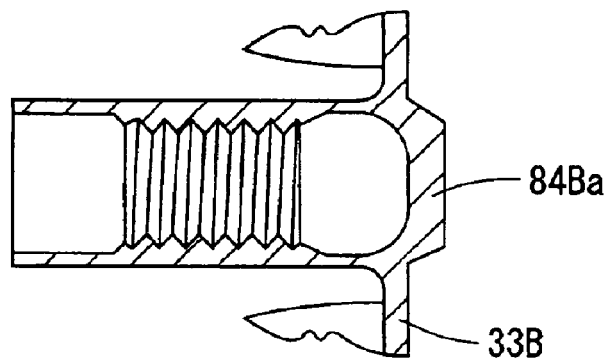
FIG. 45 is sectional side views of various types of T-nuts, wherein the exposed outer surface of a bottom-sealing member is formed as a convex surface.
Figure 45:
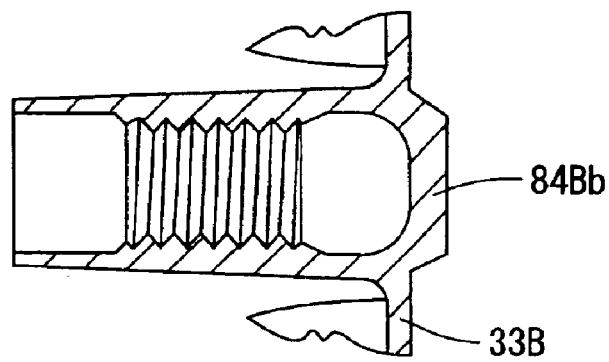
Figure 45:
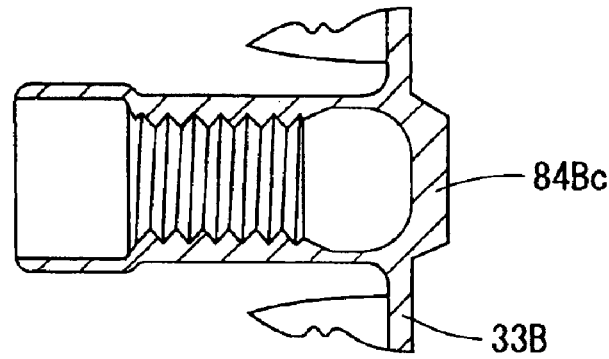
Figure 46I:
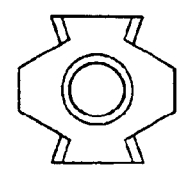
FIG. 46 is sectional side views and bottom views of various types of T-nuts, wherein the exposed outer surface of a bottom-sealing member is formed as a convex surface.
Figure 49:
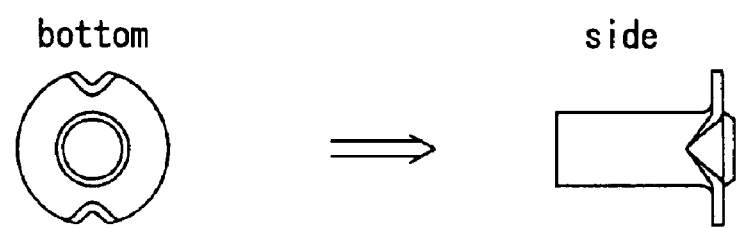
FIG. 49 is a bottom view and a side view of one type of T-nut, wherein the exposed outer surface of a bottom-sealing member is formed as a convex surface.
Figure 50:
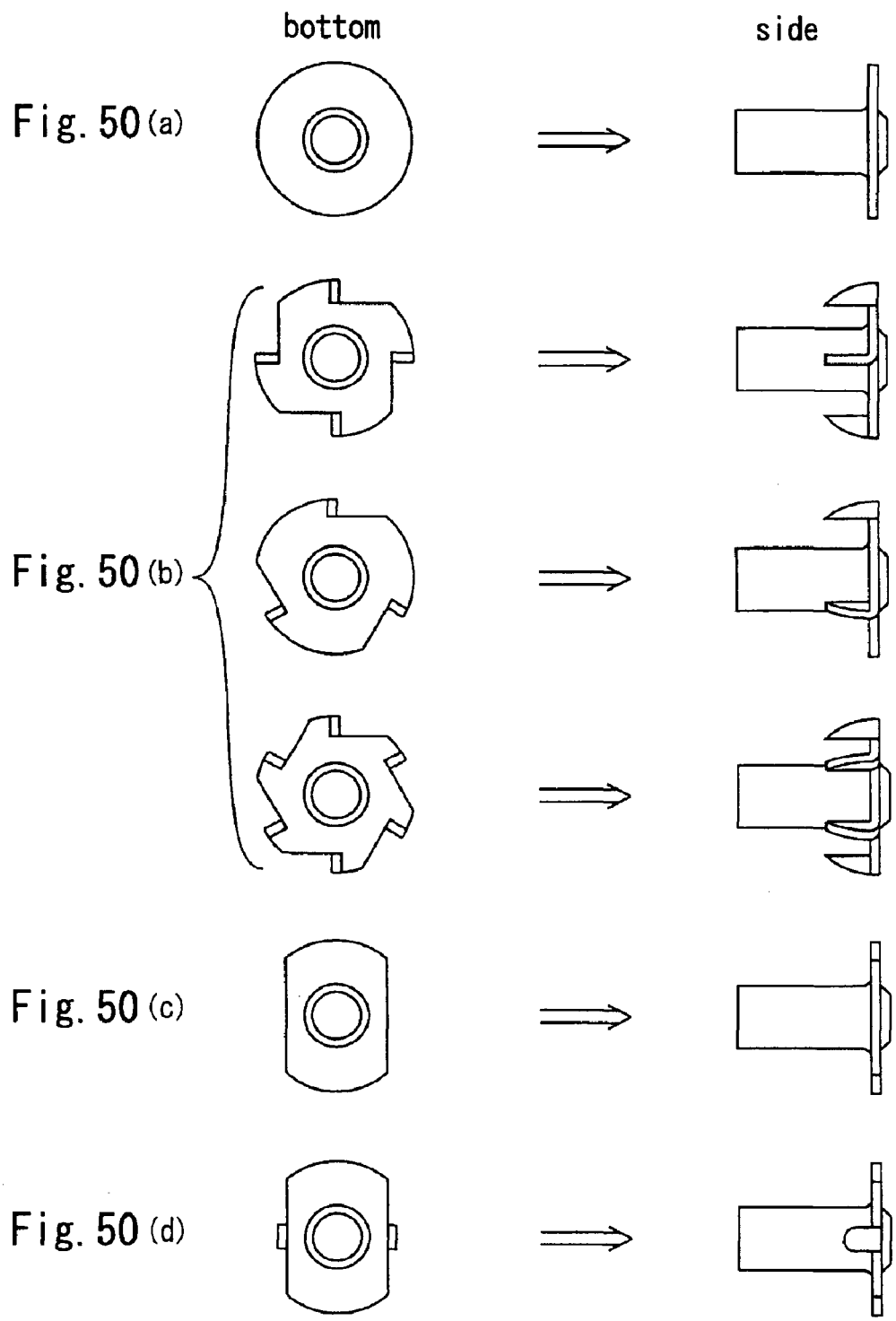
FIG. 50 is bottom views, and side views of one type of T-nut, wherein the exposed outer surface of a bottom-sealing member is formed as a convex surface.
Figure 51:
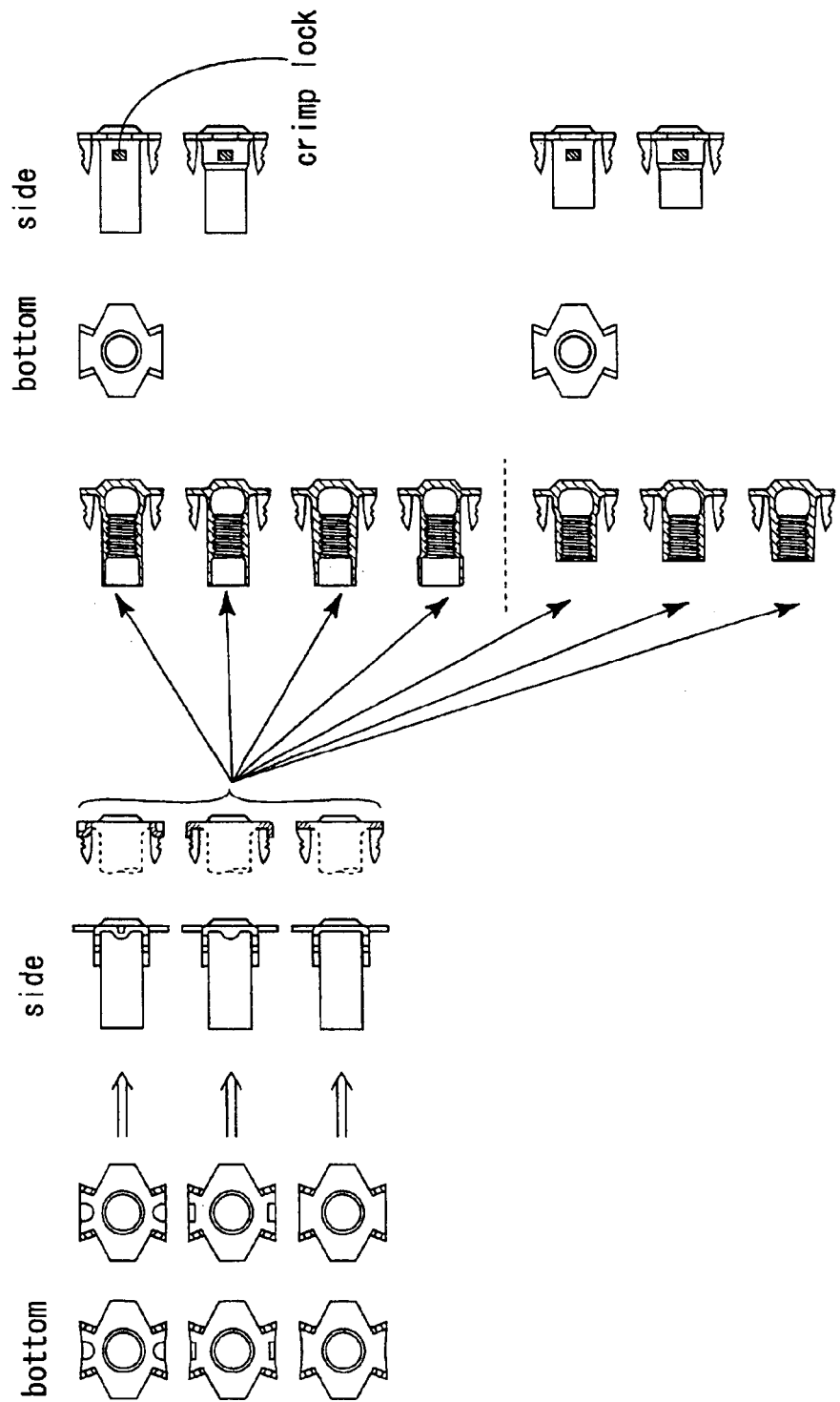
FIG. 51 is an explanatory view of various types of T-nuts, wherein the exposed outer surface of a bottom-sealing member is formed as a convex surface.
Figure 52:
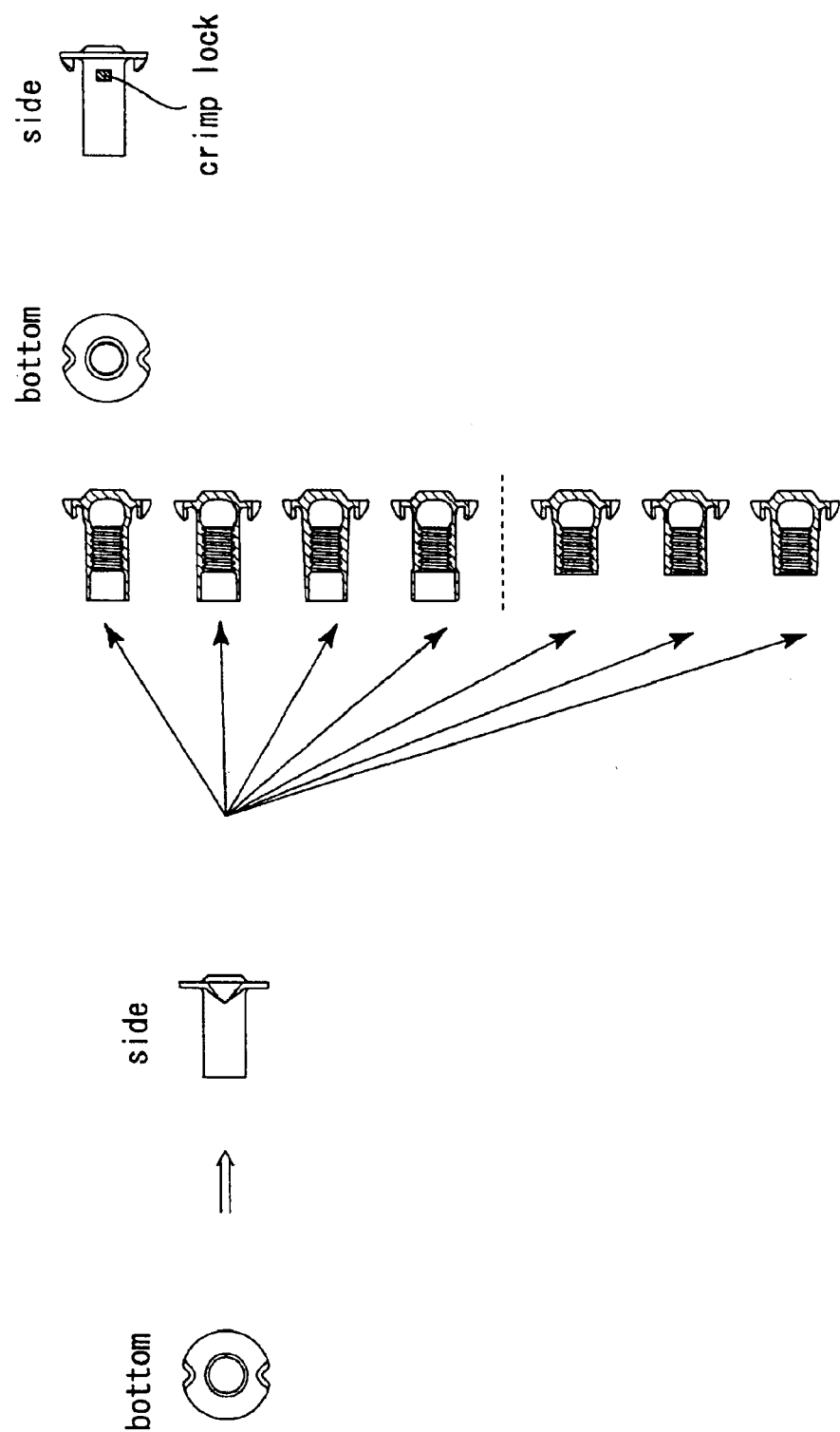
FIG. 52 is an explanatory view of various types of T-nuts, wherein the exposed outer surface of a bottom-sealing member is formed as a convex surface.
Figure 53:
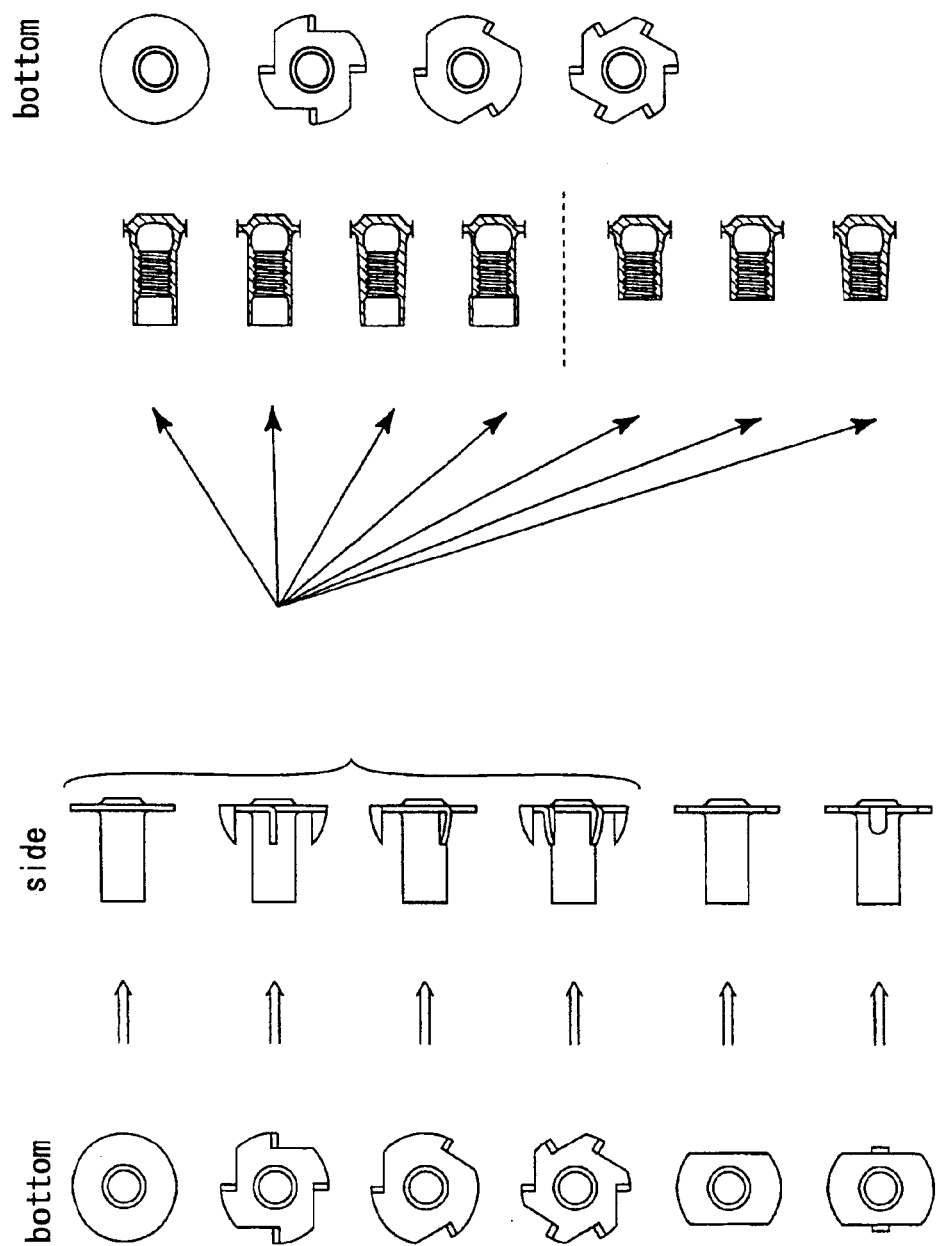
FIG. 53 is an explanatory view of various types of T-nuts, wherein the exposed outer surface of a bottom-sealing member is formed as a convex surface.
Figure 54A:
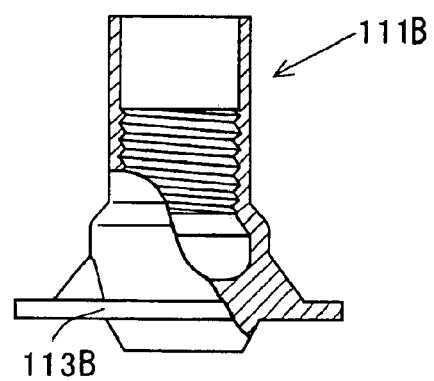
FIG. 54 is a partially sectional side view and a top plan view of another type of T-nut, wherein the exposed outer surface of a bottom-sealing member is formed as a convex surface.
Figure 54B:
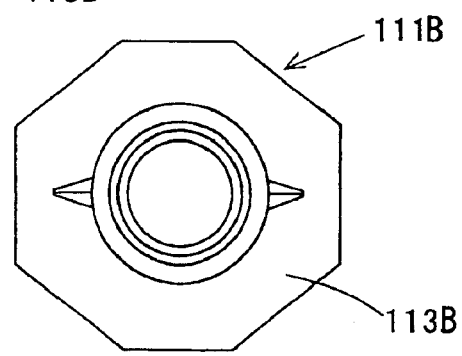
Figure 55A:
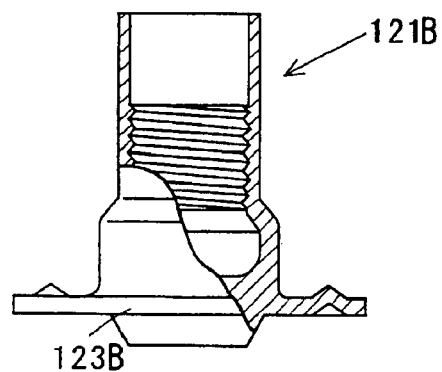
FIG. 55 is a partially sectional side view and a top plan view of still another type of T-nut, wherein the exposed outer surface of a bottom-sealing member is formed as a convex surface.
Figure 55B:
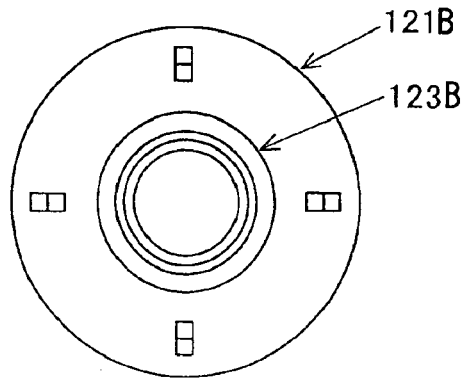

A T-nut 41 B in FIGS. 41(a) and 41(b) has a bottom-sealing member 44B formed in a flat shape. A T-nut 61B as shown in FIGS. 42(a) and 42(b) also has a bottom-sealing member 44B formed in a flat shape. Except for the structure of the bottom-sealing member and the length of the shank, the T-nuts 41A and 61A in FIGS. 26 and 27 have the same structures those of the T-nuts 41 and 61 in FIGS. 1 and 2, respectively, and the description of their structures has been omitted herein.

In an operation of fastening a plate-shaped cover member to an intermediate member with a T-nut driven therein, by use of a bolt, the T-nut 41B having the convex-shaped bottom-sealing member as shown in FIG. 3(b) may be used if the plate-shaped cover member has a sufficient softness allows. However, if the plate-shaped cover member is made of a hard material, a gap will be defectively created between the cover member and the convex-shaped bottom-sealing member. Thus, in this case, it is desired to use the T-nuts having the grooved bottom-sealing member as shown in FIGS. 1 and 2 or the T-nut having the flat-shaped sealing member as shown in FIG. 26.

As above, the exposed outer surface of the bottom-sealing member may be selectively formed as either one of a grooved surface, a flat surface and a convex surface, according to need.

The T-nut 61A as shown in FIGS. 2(a) and 2(b) is different from the T-nut 41 shown in FIG. 1 in that it includes a shank 2 which has a stepped portion 3 formed at a given position thereof, and a crimpable portion 34 formed in a hollow-cylindrical upper portion 4 thereof. The common components or elements with those of the T-nut 41 are defined by the same reference numerals or codes, and their detailed description will be omitted.

According to the T-nut 41 as shown in FIGS. 1 and 4(a) and the T-nut 61 as shown in FIGS. 2 and 4(b), the first end of the shank 2 is sealed by the bottom-sealing member 44. Thus, during an operation of applying a liquid such as oil or paint, the bottom-sealing member 44 prevents the liquid from entering in the inside of the shank.

An operation of fixing the T-nut 61 to a workpiece will be described below.

Figure 5:
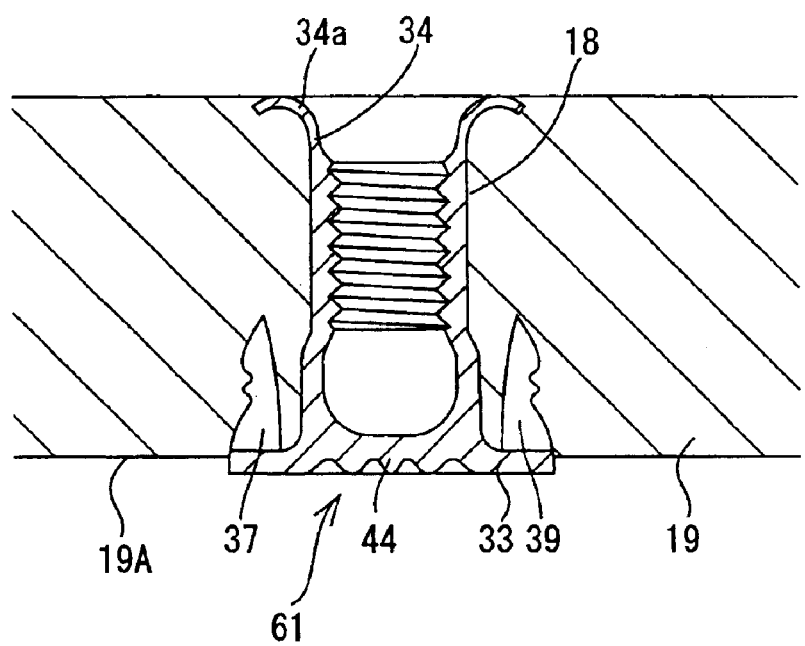
FIG. 5 is an explanatory view of a T-nut of the present invention in its fixed state.

In the fixing operation of the T-nut 61, for example as shown in FIG. 5, the shank 2 of the T-nut 61 is inserted into a through-hole 18 of a workpiece 19 such as a wooden board, and then the crimpable portion 34 is crimped by a crimping machine to form a crimped portion 34a on the side of one of the surfaces of the workpiece 19. Simultaneously, pawls 37 to 40 of a flange 33 of the T-nut 61 are driven to bite into the other surface of the workpiece 19.

In the embodiment illustrated in FIG. 5, the through-hole 18 of the workpiece 19 is arranged to have an inner diameter approximately equal to the outer diameter of the hollow-cylindrical upper portion 4, and an enlarged tubular lower portion 5 is adapted to be press-fitted into the through-hole 18 as the T-nut 61 is driven in the workpiece 19. Thus, the T-nut 16 can be firmly fixed to the workpiece 19 through the press-fitted lower portion 5 without gap between the outer periphery of the hollowcylinder upper portion 4 and the inner periphery of the through-hole 18.

An operation of applying a liquid onto the surface of the workpiece 19 with the T-nut 61 driven therein, according another embodiment of the present invention, will be described below.

In order to subject one side surface 19A of the workpiece 19 with the T-nut 61 driven therein as shown in FIG. 5, to a surface treatment, a liquid such as paint is sprayed onto the surface. During spraying, while the paint is sprayed onto not only the side surface 19A of the workpiece 19 but also the flange 33 and the sealing member 44 of the T-nut 61, it never enters in the inside of the shank.

Thus, the need for removing a liquid such as paint from the inside of the shank in the subsequent process can be eliminated so as to provide improved operating efficiency.

In another operation of immersing the side surface 19A of the workpiece 19 into a liquid such as paint or oil, while the liquid is attached onto the flange 33 and the sealing member 44 of the T-nut 61 during the immersing operation, it never enters in the inside of the shank as with the above spraying operation.

Thus, the need for removing a liquid such as paint from the inside of the shank in the subsequent process can be eliminated so as to provide improved operating efficiency.

Various modifications of the flange will be described below.

While the respective flanges 33 of the T-nut 41 as shown in FIGS. 1 and 4(a) and the T-nut 61 as shown in FIGS. 2 and 4(b) are formed in an octagonal shape, the two orthogonal lengths a, b, or lateral and longitudinal lengths, of the flange may be set to satisfy any one of the following formulas: a<b, a=b, and a>b.

Further, as shown by a T-nut 51 in FIG. 4(c), the flange may be formed in a circular shape. Alternatively, the flange may be formed in a square or rectangular shape, and a plurality of pawls may be formed at the peripheral edge of the flange. In a T-nut including such a flange extending from the first end, the first end is sealed by the bottom-sealing member as with the above T-nut including the octagonal flange.

In addition to four pawls 37, 38, 39, 40, the flange having an approximately octagonal shape may be formed with a protrusion 45, 46 which is plastically deformed to protrude toward the second end may be provided as shown in FIG. 6(a), or a spatula or paddle-shaped protrusion 47, 48 as shown in FIG. 6(b).

FIG. 6(c) shows the octagonal flange having only four pawls 37, 38, 39, 40.

Figure 7:
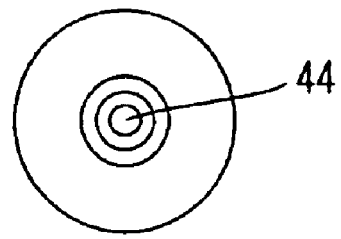
FIG. 7 is bottom views of various types of T-nut of the present invention.
Figure 7:
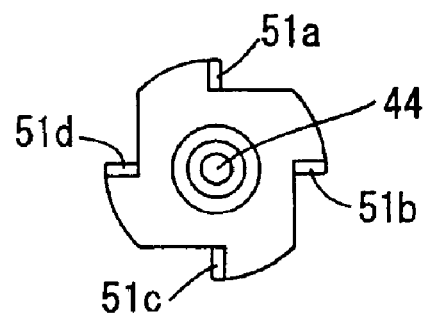
Figure 7:
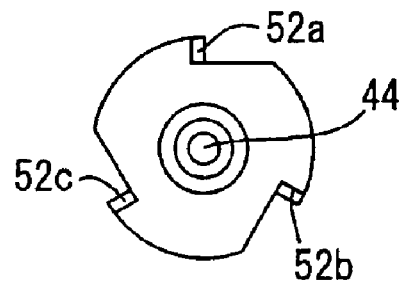
Figure 7:
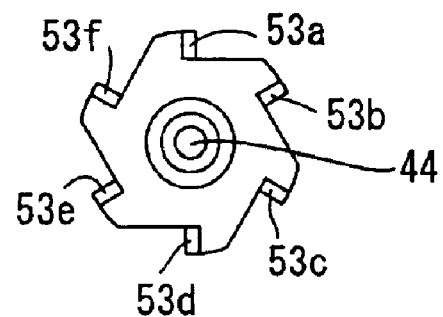

The flange having a circular shape may be formed with no pawl as shown in FIG. 7(a), four pawls 51a, 51b, 51c, 51d as shown in FIG. 7(b), three pawls 52a, 52b, 52c as shown in FIG. 7(c), or six pawls 53a, 53b, 53c, 53d, 53e, 57f as shown in FIG. 7(d).

In either case, the bottom of their shank is sealed by the bottom-sealing member as one essential feature of the present invention.

Figure 8:
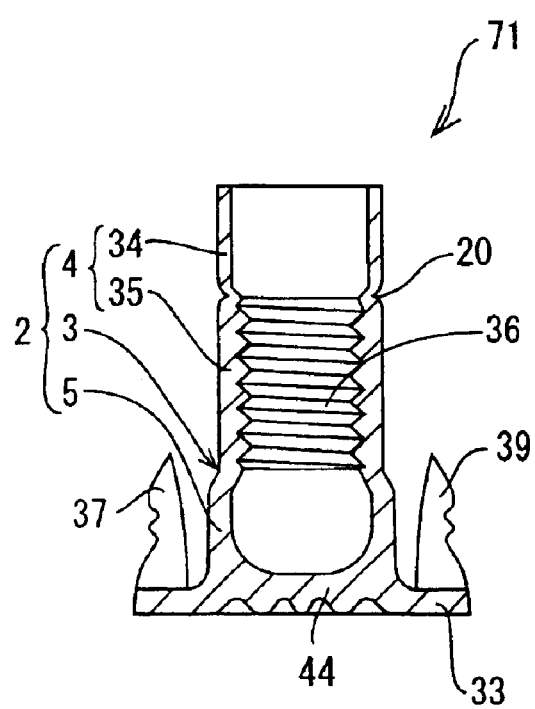
FIG. 8 is a sectional side view of a T-nut according to still another embodiment of the present invention.

With reference to FIG. 8, a T-nut 71 according to another embodiment of the present invention will be described below, wherein the T-nut includes a shank 2 having an outer peripheral surface formed with a groove. Specifically, the T-nut 71 comprises the shank 2 including a hollow-cylindrical upper portion 4 which has a crimpable portion 34 and an internally threaded portion 35. Further, the shank is formed with an annular groove 20 over the circumference of the outer peripheral surface thereof in the vicinity of the boundary between the crimpable portion 34 and the internally threaded portion 35. The groove 20 may have a cross-sectional shape such as U shape, V shape or u shape, and the cross-sectional shape is appropriately selected depending on a material of the T-nut, and a machining-characteristic or a mechanical characteristic, such as tensile strength, which are associated with the selected material.

Figure 9A:
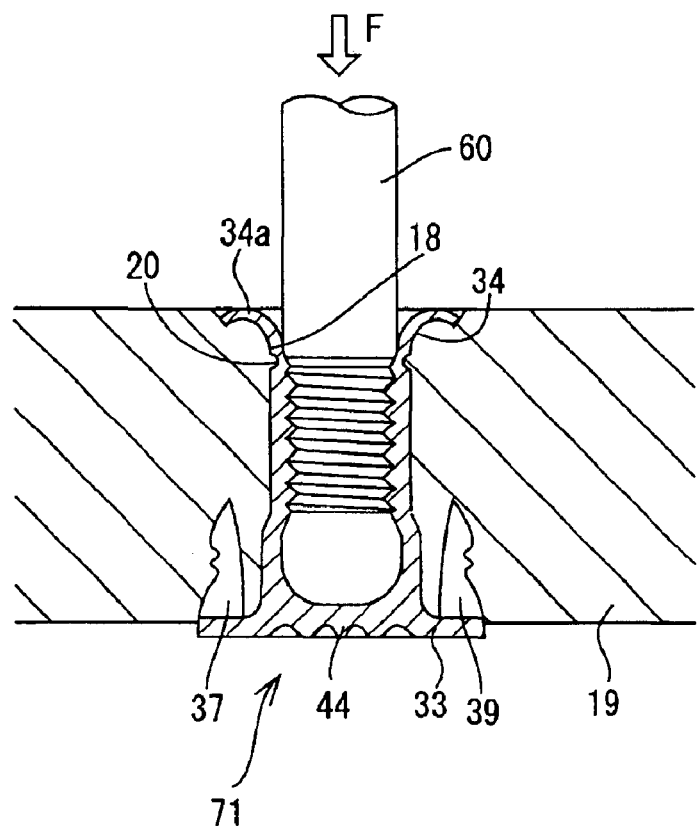
FIG. 9 is an explanatory view of the T-nut in FIG. 8 in its fixed state.

As shown in FIG. 9(a), in the fixing operation of the above T-nut 71 constructed as above, the shank 2 is first inserted into a through-hole 18 which is formed in a workpiece 19 such as a wooden board, in advance, and then the crimpable portion 34 is crimped by a crimping machine to form a crimped portion 34a on the side of one of the surfaces of the workpiece 19. Simultaneously, the pawls 37 to 40 are driven to bite into the other surface of the workpiece 19 to firmly fix the T-nut 71 to the workpiece 19.

When the workpiece 19 serves as a component of a product, after fixing the T-nut 71 to the workpiece, the external thread of an externally threaded member is driven in and fastened by the internal thread of the internally threaded portion 35 to connect another member to the workpiece. In the state after fastening the external thread to the internal thread of the internally threaded portion 35, the fastening force of the external thread mainly acts as a compressive force against the internally threaded portion 35, and thereby no excessive tensile stress is generally generated in the shank of the T-nut. Thus, any deterioration in fixing strength will not be substantially caused by the reduced strength of the shank 2 due to the presence of the groove 20.

Figure 9B:
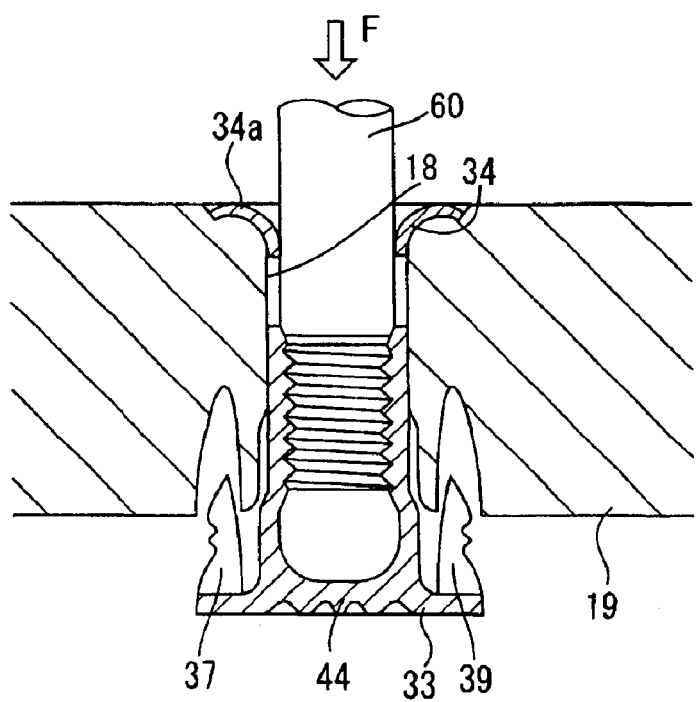

With reference to FIG. 9, an operation of separating the T-nut 71 from the workpiece 19 to collect it for the purpose of recycle use after the need or lifetime of the product including the workpiece 19 with the T-nut 71 crimped and fixed thereto has run out or expired will be described below. As shown in FIG. 9(a), the lower end of a columnar jig 60 having an outer diameter slightly larger than the inner diameter of the crimpable portion 34 before its crimpable operation is press-fitted from the side of the crimped portion 34a of the T-nut 71. Then, a force F as shown in FIG. 9(a) is applied to the jig 60 by hammering the upper end of the jig 60 while keeping the lower end of the jig 60 in contact with a stepped portion at the boundary between the crimpable portion 34 and the internally threaded portion 35. This force F causes stress concentration at a position of the outer peripheral surface of the shank where the groove is formed to provide the thinnest thickness, or at the boundary between the crimpable portion 34 and the internally threaded portion 35, so as to generate a large tensile stress. Thus, the shank is broken at the groove 20, and divided into two pieces as shown in FIG. 9(b). Then, the lower end of the jig 60 pushes the lower half of the T-nut 71 including the internally threaded portion 35 and the flange portion 33 downward to detach the lower half of the T-nut 71 from the workpiece 19. During an operation of pulling out the jig 60 upward, the upper half of the T-nut 71 is detached from the through-hole 18 of the workpiece 19 while being fitted in the jig 70.

As above, the T-nut 71 according this embodiment of the present invention can be readily detached from the workpiece 19. Thus, after the need of the product with the T-nut 71 crimped and fixed thereto has run out, the workpiece constituting the product can be readily separated and collected to facilitate the recycle use of the workpiece 19.

The type of shape of the outer peripheral surface of the shank will be described below.

FIG. 10 shows T-nuts of a type having no crimpable portion, wherein FIG. 10(a) is a sectional side view showing a step barrel type T-nut 91a having a stepped portion, FIG. 10(b) being a sectional side view showing a straight barrel type T-nut 91b having no stepped portion, and FIG. 10(c) is a sectional side view showing a taper barrel type T-nut 91c in which the outer peripheral surface of the shank has a shape gradually expanding toward the flange (first end).

In either type, the first end on the side of the flange is sealed by a bottom-sealing member 94a, 94b, 94c.

As described in connection with FIG. 5, this bottom-sealing member can also prevent a liquid such as oil or paint from entering in the inside of the shank.

FIG. 11 shows T-nuts of a type having a crimpable portion, wherein FIG. 11(a) is a sectional side view showing a straight barrel type T-nut 81a having no stepped portion, FIG. 11(b) being a sectional side view showing a taper barrel type T-nut 81b in which the outer peripheral surface of the shank has a shape gradually expanding toward the flange (first end), FIG. 11(c) being a sectional side view showing a top-broad barrel type T-nut 81c in which the crimpable portion has outer and inner diameters greater than those of the internally threaded portion.

In either type, the first end on the side of the flange is sealed by a bottom-sealing member 84a, 84b, 84c.

In view of the above types, the T-nuts as shown in FIGS. 1 and 2 are classified in a straight barrel type T-nut in which no stepped portion is formed at a given position of the shank, and a step barrel type T-nut in which a stepped portion is formed at a given position of the shank, respectively.

The taper barrel type T-nut 81b will be described in more detail with reference to FIG. 11(b).

The T-nut 81b of this type is similar to the aforementioned T-nut 41 except that the outer peripheral surface of the shank is tapered. Thus, the same components or elements as those of the T-nut 41 in FIG. 1 are defined by the same reference numerals or codes, and their description will be omitted.

The T-nut 81b of this type is different from the T-nut 41 in that the outer peripheral surface has a tapered shape gradually expanding from a crimpable portion 82 or an internally threaded portion 83 to the vicinity of a flange 33.

In the T-nut 81b of this type, if the diameter of a prepared hole of a board as a workpiece is set approximately the same as the outer diameter of the crimpable portion 82 or the internally threaded portion 83, the region extending from the internally threaded portion 83 to the flange 33 is pressed and fixed to the prepared hole as the T-nut is driven into the board, so that the T-nut is reliably fixed to the board with the resultingly obtained anti-rotation function. In addition, the crimpable portion 82 can be crimped to fix the T-nut to the board, and the pawls 37, 39 can be bitten into the board to provide an additional anti-rotation function.

With reference to FIG. 11(c), the aforementioned top-broad barrel type T-nut 81c will be described in more detail.

The T-nut 81c of this type is analogous to the T-nut 61 as shown in FIG. 2 in that it is a so-called rivet type T-nut which is based on the invention disclosed in U.S. Pat. No. 5,618,144. In FIG. 11(c), the same components or elements as those of the T-nut 61 in FIG. 2 are defined by the same reference numerals or codes, and their description will be omitted.

The T-nut 81c of the type is different from the T-nut 61 in that a crimpable portion 82 has an inner diameter greater than that of the internally threaded portion 83, and an outer diameter greater than that of the internally threaded portion 83.

In the T-nut 81c of the type, the diameter of a prepared hole of a board as a workpiece must be set greater than at least the outer diameter of the crimpable portion 82. While a certain gap is formed between the internally threaded portion 83 and the inner periphery of the prepared hole after the T-nut is driven into the board, the crimpable portion 82 can be crimped to fix the T-nut to the board, and the pawls 37, 39 can be bitten into the board to provide an anti-rotation function.

In each of the above T-nuts, the wall thickness of the crimpable portion may be set equal to that of the internally threaded portion, or may be set less than that of the internally threaded portion to facilitate the calking operation.

Various T-nuts having different shapes of the outer peripheral surface of the shank extending from the internally threaded portion to the vicinity of the flange will be described.

In one T-nut, the shank may include a stepped portion. A resultingly enlarged lower portion extending from the stepped portion to the flange may have a polygonal shape, such as an octagonal shape (FIG. 12(a)) or a square shape (FIG. 12(b)), or a non-circular shape such as an elliptic or oval shape (FIG. 12(c)), instead of a hollow cylindrical shape, when viewing in the axial direction of the shank.

The T-nut with the above structure is driven into a through-hole of a board having approximately the same diameter as that of the hollow-cylindrical upper portion, so that the non-circular enlarged tubular lower portion can be press-fitted into the through-hole and bitten into the board to provide an anti-rotation function. Thus, even if the flange has a flat circular disc shape having no pawl, the T-nut can be reliably fixed to the board without any rotational movement in its fixed state.

In each of the aforementioned T-nuts according to the aforementioned embodiments of the present invention, the stepped portion is formed over the circumference of the outer peripheral surface of the shank. However, if the enlarged tubular lower portion is formed to provide an anti-rotation function in the fixed state as in this embodiment, it is not essential to form the stepped portion over the circumference of the outer peripheral surface of the shank. More specifically, if the enlarged tubular lower portion extending from the stepped portion toward the flange is formed with an additional stepped portion in at least a part of the outer periphery of the enlarged tubular lower portion, and the additional stepped portion has a diameter greater than that the remaining enlarged tubular lower portion, the additional stepped portion can provide an anti-rotation function in the fixed state.

Various modifications of the T-nut of the present invention have been described as above. These modifications will be classified into types, and each of the types will be described with reference to drawings.

FIG. 13 shows a T-nut of a type in which the flange fundamentally has an octagonal shape.

FIG. 13(a) is a sectional side view showing a step barrel type with a crimpable portion, FIG. 13(b) being a sectional side view showing a straight barrel type with a crimpable portion, FIG. 13(c) being a sectional side view showing a taper barrel type with a crimpable portion, FIG. 13(d) being a sectional side view showing a top-broad barrel type with a crimpable portion, FIG. 13(e) being a bottom view of these flanges. FIG. 13(f) is a sectional side view showing a step barrel type without any crimpable portion, FIG. 13(g) being a sectional side view showing a straight barrel type without any crimpable portion, FIG. 13(h) being a sectional side view showing a taper barrel type without any crimpable portion, and FIG. 13(i) being a bottom view of these flanges.

FIG. 14 shows T-nuts of a type in which the flange fundamentally has a circular shape, and the pawl is formed through a plastic deformation process.

FIG. 14(a) is a sectional side view showing a step barrel type with a crimpable portion, FIG. 14(b) being a sectional side view showing a straight barrel type with a crimpable portion, FIG. 14(c) being a sectional side view showing a taper barrel type with a crimpable portion, and FIG. 14(d) being a sectional side view showing a top-broad barrel type with a crimpable portion. FIG. 14(f) is a sectional side view showing a step barrel type without any crimpable portion, FIG. 14(g) being a sectional side view showing a straight barrel type without any crimpable portion, FIG. 14(h) being a sectional side view showing a taper barrel type without any crimpable portion, and FIG. 14(e) being a bottom view of these flanges.

FIG. 15 shows a T-nut of a type in which the flange fundamentally has a circular shape, and the pawl is formed through a notching/bending process.

FIG. 15(a) is a sectional side view showing a step barrel type with a crimpable portion, FIG. 15(b) being a sectional side view showing a straight barrel type with a crimpable portion, FIG. 15(c) being a sectional side view showing a taper barrel type with a crimpable portion, and FIG. 15(d) being a sectional side view showing a top-broad barrel type with a crimpable portion.

Figure 16:
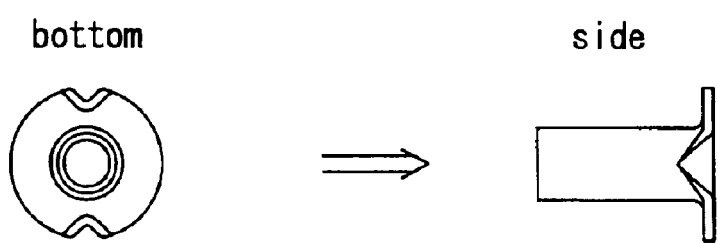
FIG. 16 is a bottom view and a side view of one type of T-nut of the present invention.
Figure 17:
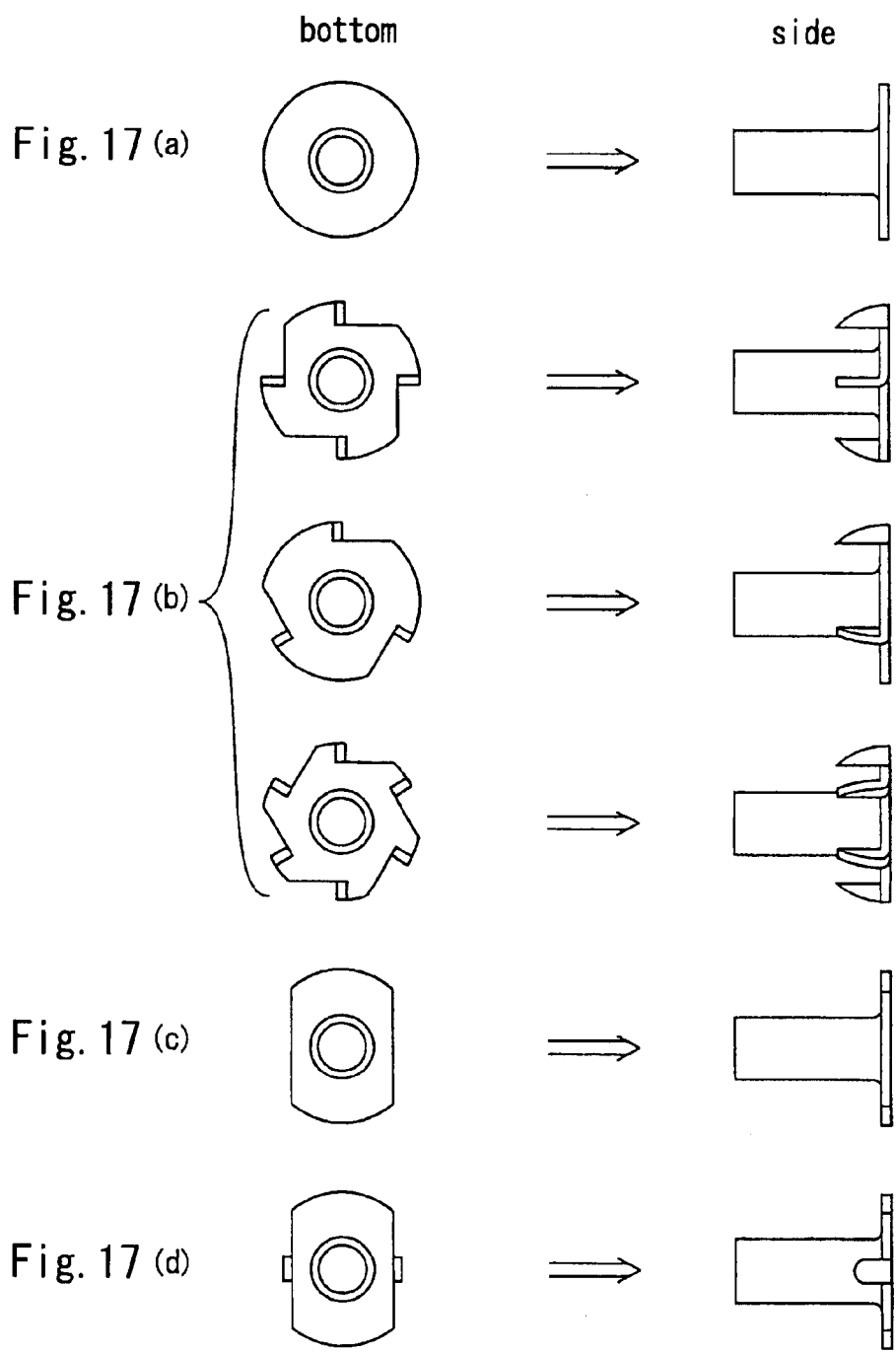
FIG. 17 is bottom views and side views of various types of T-nuts of the present invention.

FIG. 15(f) is a sectional side view showing a step barrel type without any crimpable portion, FIG. 15(g) being a sectional side view showing a straight barrel type without any crimpable portion, FIG. 15(h) being a sectional side view showing a taper barrel type without any crimpable portion, and FIG. 15(e) being a bottom view of these flanges. The detail of FIG. 15(e) is the same as that described in connection with FIG. 7, and its description will be omitted herein. FIG. 16 is a bottom view and a side view of a T-nut of a type in which the flange fundamentally has a circular shape, and the pawl is formed through a plastic deformation process. FIG. 17(a) is a bottom view and a side view of a T-nut of a type in which the flange fundamentally has a circular shape, and FIG. 17(b) is a bottom view and a side view of a T-nut of a type in 3 to 6 pawls are additionally formed through a notching/bending process. FIG. 17(c) is a bottom view and a side view of a T-nut of a type in which the flange has a shape defined by two arcs and parallel lines, and FIG. 17(b) is a bottom view and a side view of a T-nut of a type in 2 pawls are additionally formed.

Figure 18:
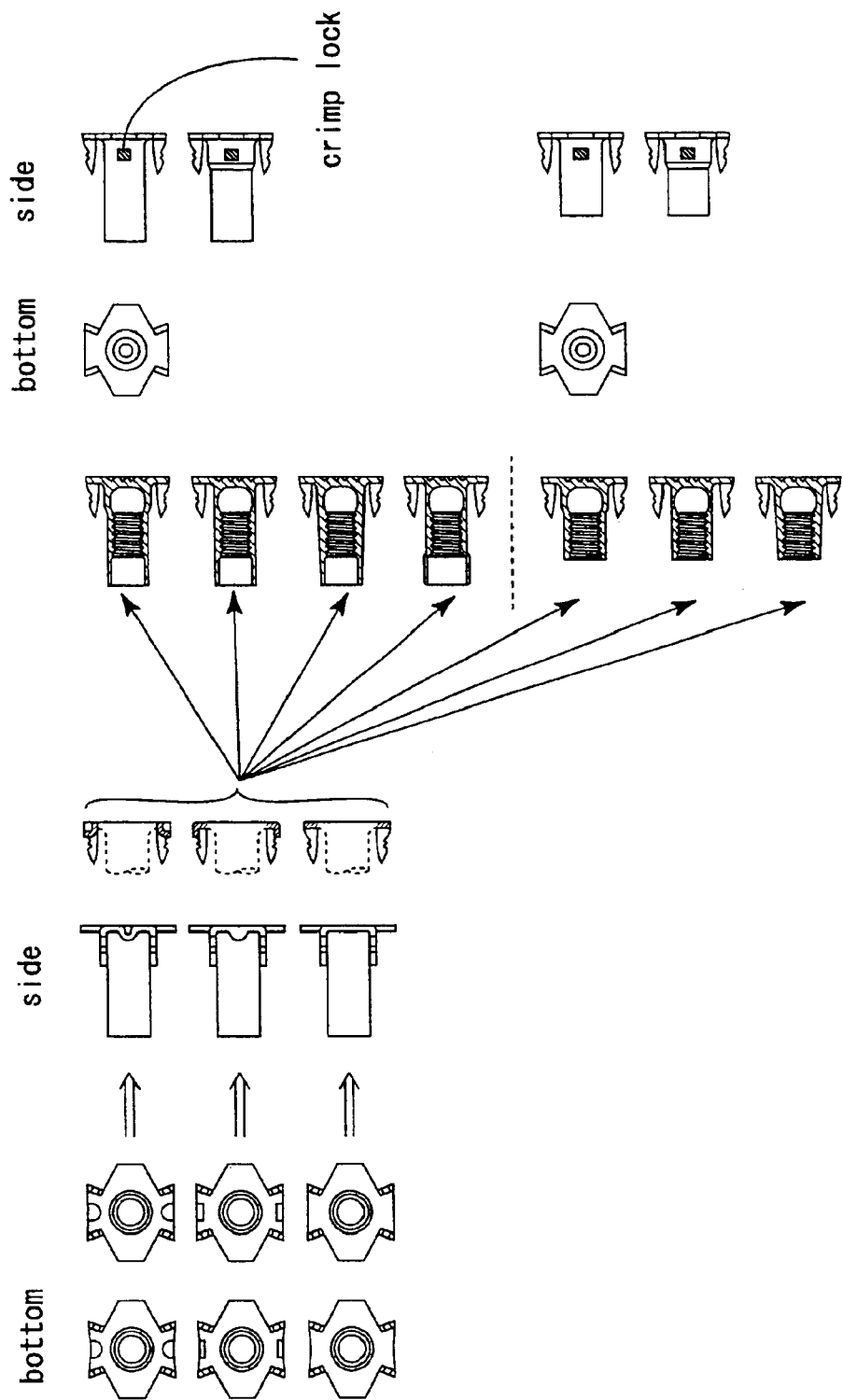
FIG. 18 is an explanatory view of various types of T-nuts of the present invention.

FIG. 18 is an explanatory view of T-nuts in various combinations of each of the barrel type T-nuts and pawls, in which their flange fundamentally has an octagonal shape. Each of the T-nuts has one or more crimp locks formed in the outer peripheral surface of the shank.

Figure 19:
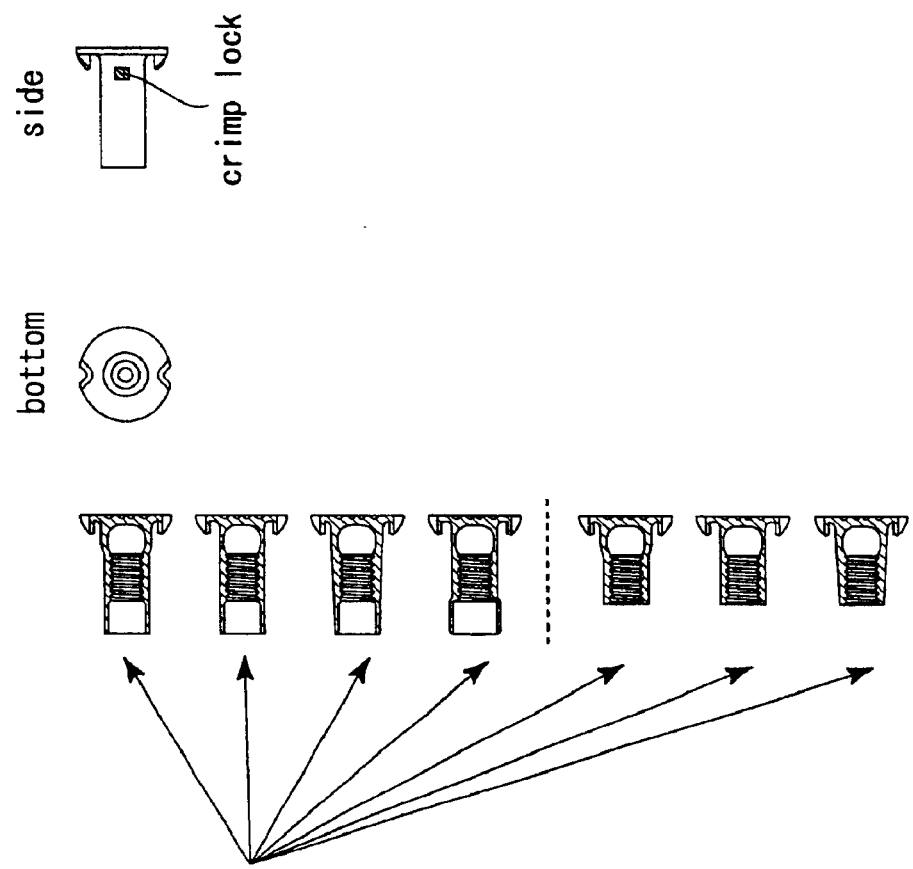
FIG. 19 is an explanatory view of various types of T-nuts of the present invention.

FIG. 19 is an explanatory view of each of the barrel type T-nuts, in which the flange fundamentally has a circular shape. Each of the T-nuts has one or more crimp locks formed in the outer peripheral surface of the shank.

Figure 20:
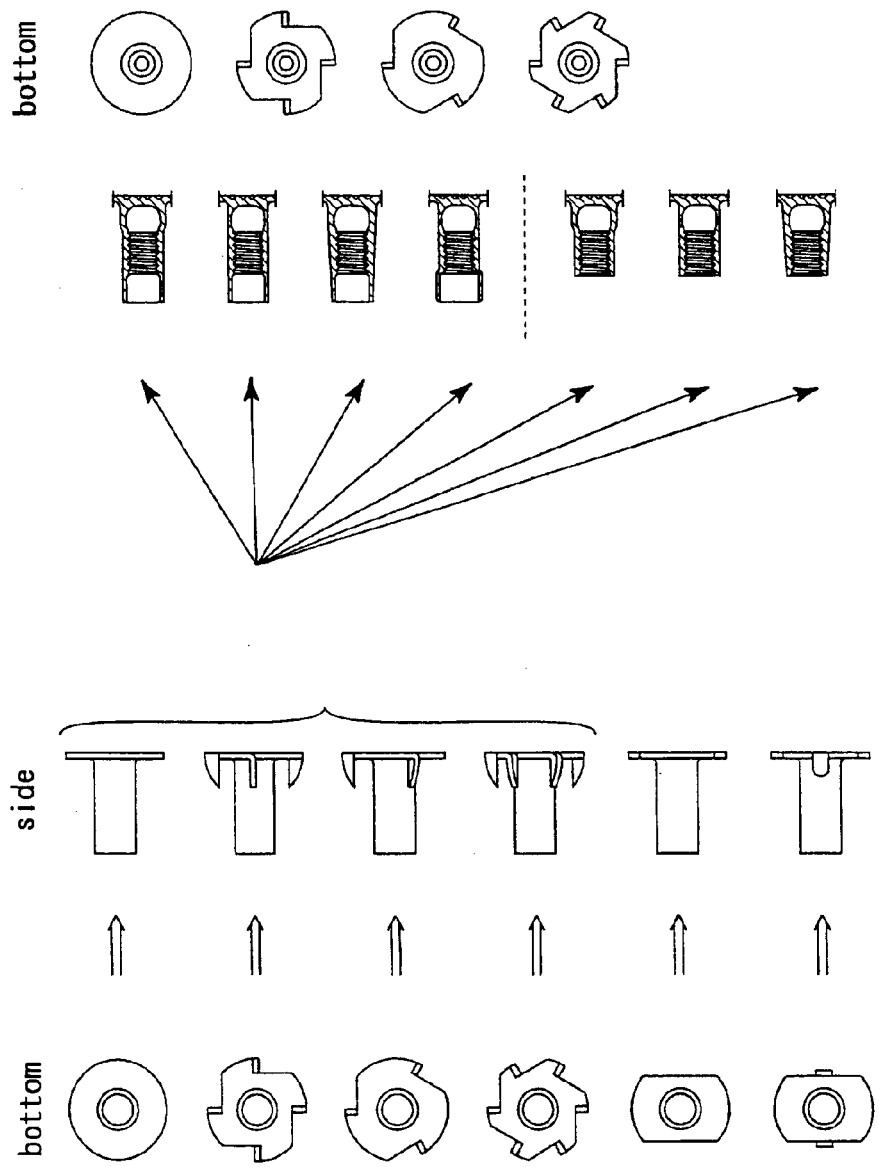
FIG. 20 is an explanatory view of various types of T-nuts of the present invention.

FIG. 20 is an explanatory view of T-nuts in various combinations of fundamentally circular flanges and each of the barrel type T-nuts and pawls.

A method of forming a pawl in a flange will be described below by an example.

Figure 4:
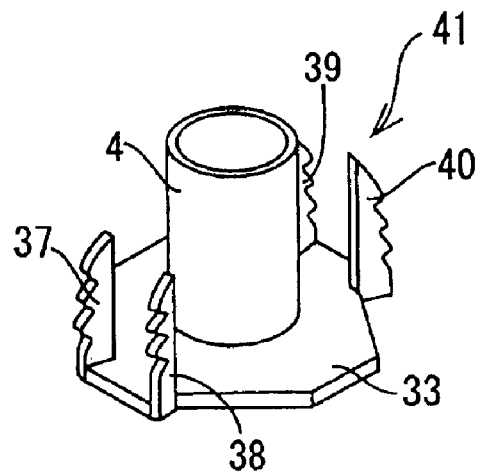
FIG. 4 is perspective views of T-nuts of the present invention.
Figure 4:
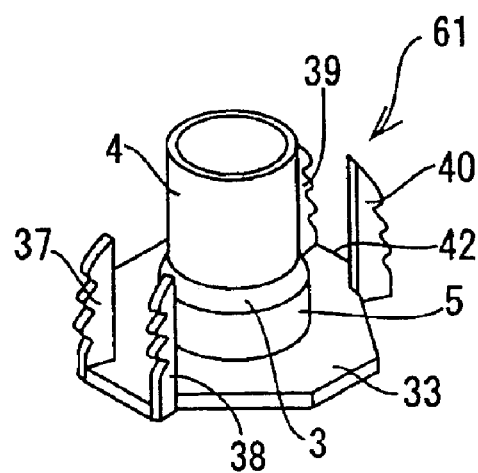
Figure 4:
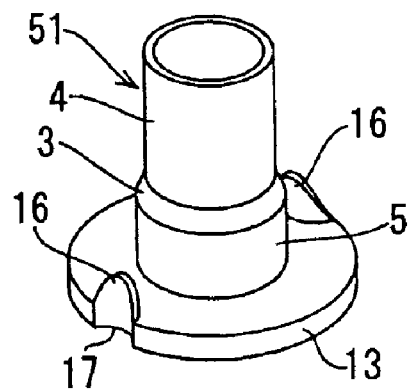

In the T-nuts 41, 61 as shown in FIGS. 4(a) and 4(b), the four pawls 37 to 40 are formed by notching and bending the outer peripheral portion of the flange 33. Alternatively, as shown by the T-nut 51 in FIG. 4(*c*), a part of the outer peripheral portion of the flange 13 may be plastically deformed toward the shank 4 to form the pawls 16.

As with the T-nut in FIG. 5, in the fixing operation, the T-nut 51 is driven into and press-fittedly fixed to the through-hole 18 of the workpiece 19 to provide the same effect of that in the T-nut 41.

Figure 21A:
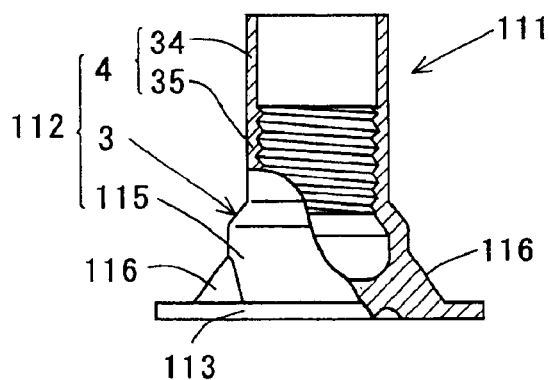
FIG. 21 is a partially sectional side view and a top plan view of another type of T-nut of the present invention.
Figure 21B:
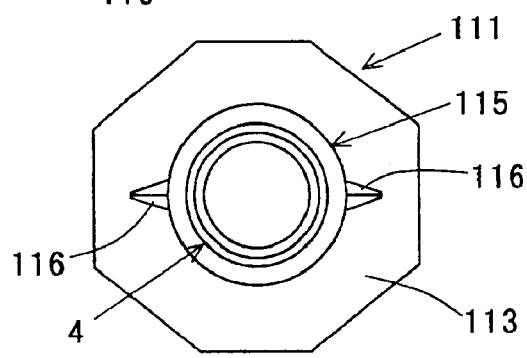

With reference to FIGS. 21(*a*) and 21(*b*), a T-nut 111 according to another embodiment of the present invention will be described. This T-nut 111 is common with the T-nut 41 as shown in FIG. 1 in that it comprises a shank 112 which includes a stepped portion 3, and a hollow-cylindrical upper portion 4 having a crimpable portion 34 and an internally threaded portion 35. The T-nut 111 is different from the T-nut 41 in that a pair of approximately triangular protrusions 116 are formed at corresponding positions opposed to each other at 180-degree in the vicinity of the boundary between a flange 113 and the outer peripheral surface of an enlarged tubular upper portion 115 extending from the stepped portion 3 toward the flange 113. The protrusions 116 are formed integrally with the enlarged tubular lower portion 115 and the flange 113. In the fixed state after driving the T-nut into a board, the protrusions 116 can bite into the board to provide an anti-rotation function for the T-nut 111. While the T-nut 111 is provided with the two protrusions. 116, the number of the protrusions may be appropriately increased according to need to enhance the anti-rotation function.

Figure 22A:
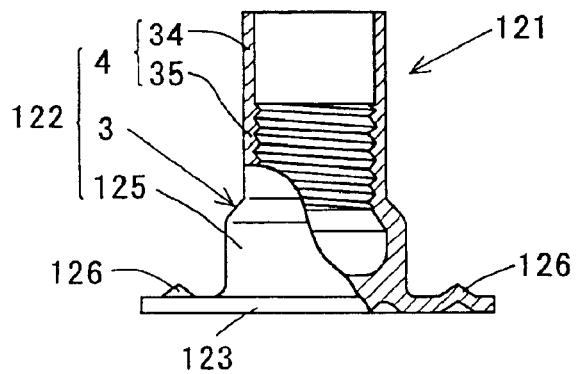
FIG. 22 is a partially sectional side view and a top plan view of a T-nut according to still another embodiment of the present invention.
Figure 22B:
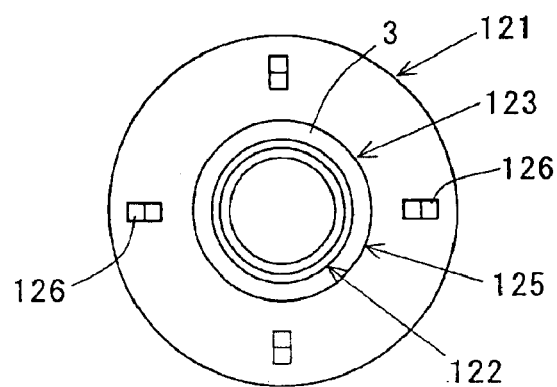
Figure 23:
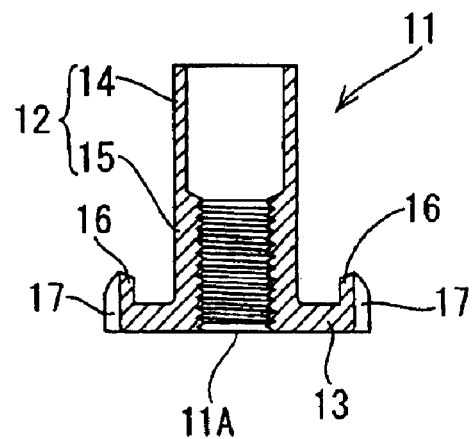
FIG. 23 is a sectional side view and a perspective view of a conventional T-nut.
Figure 23:
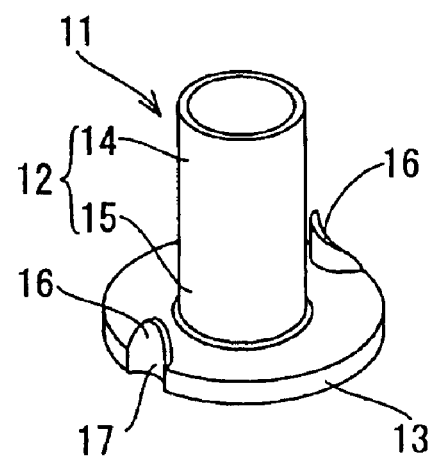
Figure 24:
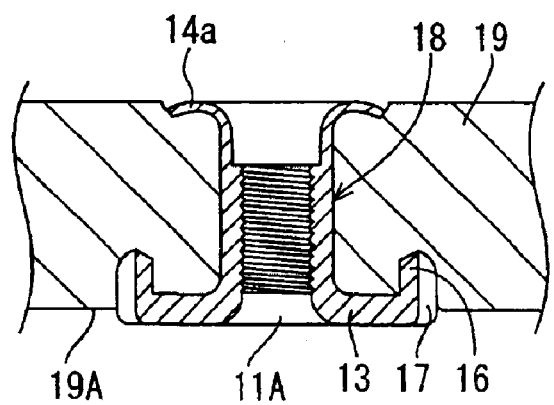
FIG. 24 is sectional side views of conventional T-nuts in their fixed state.
Figure 24:
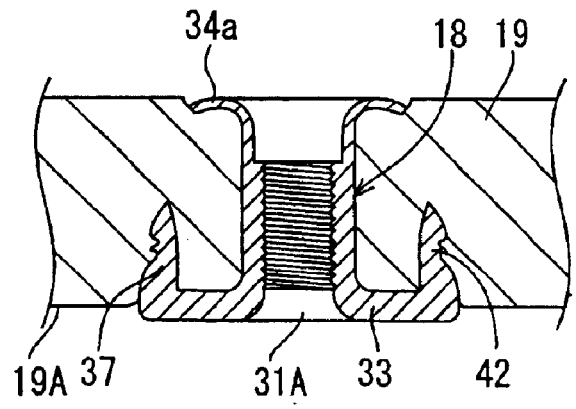

Alternatively, as shown by a T-nut 121 in FIGS. 22(*a*) and 22(*b*), an enlarged tubular lower portion 125 is formed in a hollow-cylindrical shape as with the T-nut 41, and four protrusions 126 as a substitute for the protrusions 116 in the T-nut 111 are formed integrally with the flange 123 by making two parallel notches in a circular disc-shaped flange 123 and pushing the notched portion upward. In this case, the protrusions 126 can provide the same anti-rotation function as that of the protrusions 116 of the T-nut 111. While the T-nut 121 is provided with the four protrusions 126 disposed at even intervals, it is understood that the number or positions of the protrusions 126 may be appropriately changed according to need.

Various types of T-nuts of the present invention in which the exposed outer surface of a bottom-sealing member of the T-nut is formed as a flat surface are shown in FIGS. 26 to 40. As shown in FIGS. 26 to 40, when the exposed outer surface of a bottom-sealing member of the T-nut is formed as a flat surface, the exposed outer surface becomes flat without irregularity in the sectional side view, and no concentric circular pattern appears in the bottom view.

In each of T-nuts 71A, 94A*a*, 94A*b*, 94A*c*, 84A*a*, 84A*b*, 84A*c*, 111A, 121A as shown in FIGS. 28, 29, 30, 39 and 40, the exposed outer surface of a bottom-sealing member is formed as a flat surface.

The T-nuts in FIGS. 26 to 40 are different from the T-nuts in FIGS. 1 to 22 simply in terms of the shape of the exposed outer surface of their bottom-sealing member, but the shapes and functions of the remaining components or elements are the same. Thus, their description is omitted.

Various types of T-nuts of the present invention in which the exposed outer surface of a bottom-sealing member of the T-nut is formed as a convex surface are shown in FIGS. 41 to 55.

As shown in FIGS. 41 to 55, when the exposed outer surface of a bottom-sealing member of the T-nut is formed as a convex surface, the convex portion appears in the sectional side view, and a concentric circular pattern appears in the bottom view.

In each of T-nuts 71B, 94B*a*, 94B*b*, 94B*c*, 84B*a*, 84B*b*, 84B*c*, 111B, 121B as shown in FIGS. 43,*b* 44, 45, 54 and 55, the exposed outer surface of a bottom-sealing member is formed as a convex surface.

The T-nuts in FIGS. 41 to 55 are different from the T-nuts in FIGS. 1 to 22 simply in terms of the shape of the exposed outer surface of their bottom-sealing member, and a shorter length of their shank. The shapes and functions of the remaining components or elements are the same, and their description is omitted.

In the T-nuts according to the aforementioned embodiments of the present invention, it is preferable that a part of threads of the internally threaded portion in the T-nut is unconformably arranged as lock means for preventing loosening of a bolt to be engaged with the threads.

The above embodiments have been disclosed by way of example, and the present invention is not limited thereto. It is intended that the following claims define the scope of the present invention and all modifications within the scope of these claims and their equivalents be covered thereby.

According the T-nut of the present invention, the vicinity of the first end of the shank is sealed by the bottom-sealing member. Thus, the bottom-sealing member can prevent a chemical liquid such as paint or oil from entering into the inside of the shank.

The stepped portion may be advantageously formed in the shank to allow the T-nut to be reliably fixed to a workpiece.

The outer peripheral surface of the shank may be advantageously formed in a tapered shape to allow the T-nut to be reliably fixed to a workpiece.

The crimpable portion may be advantageously formed in the shank to allow the T-nut to be reliably fixed to a workpiece through a crimping operation.

The concave groove may be circularly formed over the outer peripheral surface of the shank in the vicinity of the boundary between the crimpable portion and the internally threaded portion to provide a T-nut suitable for facilitating the recycle of a workpiece.

What is claimed is:

1. A T-nut comprising:
    a tubular shank portion having a first end and a second end opposing to said first end, said tubular shank portion having a threaded portion formed at an inside surface thereof,
    a flange portion extending outward from said first end of said tubular shank portion; and
    a bottom-sealing portion closing said first end of said tubular shank portion,
    wherein the T-nut is made of a metal material and formed from a single unitary piece of said metal material and wherein the bottom-sealing portion formed with the flange portion has an outside surface having a convex portion within circular grooves.

2. The T-nut as defined in claim 1, wherein said tubular shank portion includes:
    a stepped portion formed at a given axial position of said tubular shank portion;
    a tubular upper portion extending from said second end to said stepped portion; and
    an enlarged tubular lower portion extending from said stepped portion to said flange portion, said lower portion having an outer diameter greater than that of said upper portion.

3. The T-nut as defined in claim 1, wherein the outer peripheral surface of said tubular shank portion has a shape gradually expanding from said second end toward said first end.

4. The T-nut as defined in claim 1, wherein said tubular shank portion includes a crimpable portion extending from said second end by a given length.

5. The T-nut as defined in claim 4, wherein said crimpable portion of said tubular shank portion has an inner diameter greater than that of said internally threaded portion, and an outer diameter greater than that of said internally threaded portion.

6. The T-nut as defined in claim 4, wherein the outer peripheral surface of said tubular shank portion includes an annular concave groove formed therein in the vicinity of the boundary between said crimpable portion and said internally threaded portion.

7. The T-nut as defined in claim 1, wherein said flange portion is formed with a protrusion extending toward said second end.

8. The T-nut as defined in claim 1, further comprising a plurality of pawls extending from said first end toward said second end.

9. The T-nut as defined in claim 8, wherein said pawls are formed in a jagged shape.

10. The T-nut as defined in claim 8, wherein said pawls are formed in a hook shape.

11. The T-nut as defined in claim 1, wherein said flange portion has an approximately circular shape.

12. The T-nut as defined in claim 8, wherein said flange portion has a longitudinal length greater than the lateral length thereof.

13. The T-nut as defined in claim 8, wherein said flange portion has a longitudinal length equal to the lateral length thereof.

14. The T-nut as defined in claim 8, wherein said flange portion has a longitudinal length less than the lateral length thereof.

15. The T-nut as defined in claim 1, which has a space formed between said internally threaded portion and said bottom-sealing member.

16. The T-nut as defined in claim 1, wherein the flange portion is approximately octagonal.

17. The T-nut as defined in claim 1, further comprising a plurality of pawls extending in parallel from an outer peripheral portion of said flange portion in the direction from said first end to said second end.

* * * * *